US012054415B2

(12) United States Patent
Rosier

(10) Patent No.: US 12,054,415 B2
(45) Date of Patent: Aug. 6, 2024

(54) METHODS FOR LASER PROCESSING ROUGH TRANSPARENT WORKPIECES USING PULSED LASER BEAM FOCAL LINES AND A FLUID FILM

(71) Applicant: Corning Incorporated, Corning, NY (US)

(72) Inventor: Elisabeth Johanna Rosier, Munich (DE)

(73) Assignee: CORNING INCORPORATED, Corning, NY (US)

( * ) Notice: Subject to any disclaimer, the term of this patent is extended or adjusted under 35 U.S.C. 154(b) by 911 days.

(21) Appl. No.: 16/367,669

(22) Filed: Mar. 28, 2019

(65) Prior Publication Data
US 2019/0300418 A1 Oct. 3, 2019

Related U.S. Application Data

(60) Provisional application No. 62/649,698, filed on Mar. 29, 2018.

(51) Int. Cl.
*C03B 33/02* (2006.01)
*B23K 26/00* (2014.01)
(Continued)

(52) U.S. Cl.
CPC ...... *C03B 33/0222* (2013.01); *B23K 26/0006* (2013.01); *B23K 26/009* (2013.01);
(Continued)

(58) Field of Classification Search
None
See application file for complete search history.

(56) References Cited

U.S. PATENT DOCUMENTS 5,669,979 A 9/1997 Elliott et al.
5,725,914 A 3/1998 Opower
(Continued)

FOREIGN PATENT DOCUMENTS

DE 102016213802 A1 2/2018
GB 2536276 A * 9/2016 ......... B23K 26/0648
(Continued)

OTHER PUBLICATIONS

Antonio Ortiz-Ambriz et al Generation of arbitrary complex quasi-nondiffracting optical patterns Optical Society of America 2013 (Year: 2013).*
(Continued)

*Primary Examiner* — Jodi C Franklin
(74) *Attorney, Agent, or Firm* — Yiqun Zhao

(57) ABSTRACT

A method for processing a transparent workpiece includes applying a fluid film having a first refractive index to a impingement surface of the transparent workpiece that has a second refractive index. Further, a difference between the first refractive index and the second refractive index is about 0.8 or less and the impingement surface comprises a surface roughness Ra of about 0.1 μm or greater. The method also includes forming a defect in the transparent workpiece by directing a laser beam oriented along a beam pathway and output by a beam source, through the fluid film, through the impingement surface, and into the transparent workpiece such that a portion of the laser beam directed into the transparent workpiece generates an induced absorption within the transparent workpiece, the induced absorption producing the defect within the transparent workpiece.

20 Claims, 10 Drawing Sheets

(51) Int. Cl.
*B23K 26/0622* (2014.01)
*B23K 26/122* (2014.01)
*B23K 26/362* (2014.01)
*B23K 26/53* (2014.01)
*C03B 33/04* (2006.01)
*B23K 103/00* (2006.01)

(52) U.S. Cl.
CPC ........ *B23K 26/0624* (2015.10); *B23K 26/122* (2013.01); *B23K 26/362* (2013.01); *B23K 26/53* (2015.10); *C03B 33/04* (2013.01); *B23K 2103/54* (2018.08)

(56) References Cited

U.S. PATENT DOCUMENTS

| | | | |
|---|---|---|---|
| 5,736,464 A | 4/1998 | Opower | |
| 5,902,499 A | 5/1999 | Richerzhagen | |
| 6,566,629 B1 | 5/2003 | Dulaney et al. | |
| 7,148,448 B2 | 12/2006 | Warren, Jr. et al. | |
| 8,389,891 B2* | 3/2013 | Bovatsek | B29C 66/1122 219/121.69 |
| 10,112,340 B2* | 10/2018 | Maurice | B29C 59/16 |
| 10,131,016 B1* | 11/2018 | Geerlings | C03B 33/0222 |
| 10,144,093 B2* | 12/2018 | Marjanovic | B23K 26/53 |
| 10,293,436 B2* | 5/2019 | Marjanovic | B23K 26/384 |
| 10,730,783 B2* | 8/2020 | Akarapu | C03B 33/082 |
| 11,130,701 B2* | 9/2021 | Akarapu | B23K 26/0006 |
| 11,524,366 B2* | 12/2022 | Groninger | C03B 33/04 |
| 2003/0127441 A1* | 7/2003 | Haight | B23K 26/40 219/121.84 |
| 2005/0173388 A1* | 8/2005 | Lavers | B23H 9/10 205/665 |
| 2008/0286488 A1 | 11/2008 | Li et al. | |
| 2010/0025387 A1 | 2/2010 | Arai et al. | |
| 2010/0208237 A1* | 8/2010 | Mazur | B29C 33/40 427/515 |
| 2012/0111310 A1* | 5/2012 | Ryu | C03B 33/091 125/30.01 |
| 2013/0126573 A1* | 5/2013 | Hosseini | C03C 23/0025 225/2 |
| 2013/0192305 A1* | 8/2013 | Black | C03C 15/02 65/30.14 |
| 2013/0208074 A1* | 8/2013 | Zhang | B23K 26/40 347/264 |
| 2013/0323469 A1* | 12/2013 | Abramov | B23K 26/364 428/155 |
| 2014/0038392 A1* | 2/2014 | Yonehara | H01L 31/0682 438/463 |
| 2014/0147624 A1* | 5/2014 | Streltsov | B23K 26/361 65/30.14 |
| 2015/0060402 A1* | 3/2015 | Burkett | B23K 26/362 216/41 |
| 2015/0158116 A1* | 6/2015 | Zhang | B23K 26/009 428/142 |
| 2015/0165562 A1* | 6/2015 | Marjanovic | C03B 33/0222 219/121.72 |
| 2015/0166395 A1* | 6/2015 | Marjanovic | B32B 17/10 428/131 |
| 2017/0001900 A1* | 1/2017 | Marjanovic | B23K 26/04 428/155 |
| 2017/0008793 A1* | 1/2017 | Bankaitis | C03B 33/091 |
| 2017/0023841 A1* | 1/2017 | N'Gom | B32B 17/00 |
| 2017/0052381 A1* | 2/2017 | Huang | B23K 26/073 |
| 2018/0088358 A1* | 3/2018 | Kliner | G02B 6/021 |
| 2018/0093914 A1* | 4/2018 | Akarapu | B23K 26/0608 |
| 2018/0141154 A1 | 5/2018 | Oogushi et al. | |
| 2018/0284490 A1* | 10/2018 | Hemenway | B23K 1/0016 |
| 2018/0299741 A1* | 10/2018 | Giron | C03B 33/074 |
| 2018/0354067 A1* | 12/2018 | Iizuka | B23K 26/53 |
| 2018/0370073 A1* | 12/2018 | Swoboda | H01L 31/1896 |
| 2019/0144325 A1* | 5/2019 | Bowden | C03B 33/04 219/121.69 |
| 2019/0231602 A1* | 8/2019 | Locke | A61F 13/00987 |
| 2019/0263709 A1* | 8/2019 | Becker | B23K 26/53 |
| 2019/0321921 A1* | 10/2019 | Paris | B23K 26/364 |
| 2020/0331793 A1* | 10/2020 | Akarapu | B23K 26/0869 |
| 2020/0353567 A1* | 11/2020 | Matsuo | C03B 33/033 |

FOREIGN PATENT DOCUMENTS

| | | |
|---|---|---|
| JP | 2016-221557 A | 12/2016 |
| TW | 201703912 A | 2/2017 |

OTHER PUBLICATIONS

International Search Report and Written Opinion of the International Searching Authority; PCT/US2019/024651; mailed Aug. 1, 2019; 11 pages; European Patent Office.
Borghi et al; "M2 Factor of Bessel-Gauss Beams"; Optics Letters; vol. 22, No. 5.; Mar. 1, 1997; pp. 262-264.
Siegman; "New Developments in Laser Resonators"; SPIE vol. 1224; Optical Resonators (1990) pp. 1-14.
Taiwanese Patent Application No. 108110827, Office Action, dated Apr. 13, 2023, 1 page; Taiwanese Patent Office.

* cited by examiner

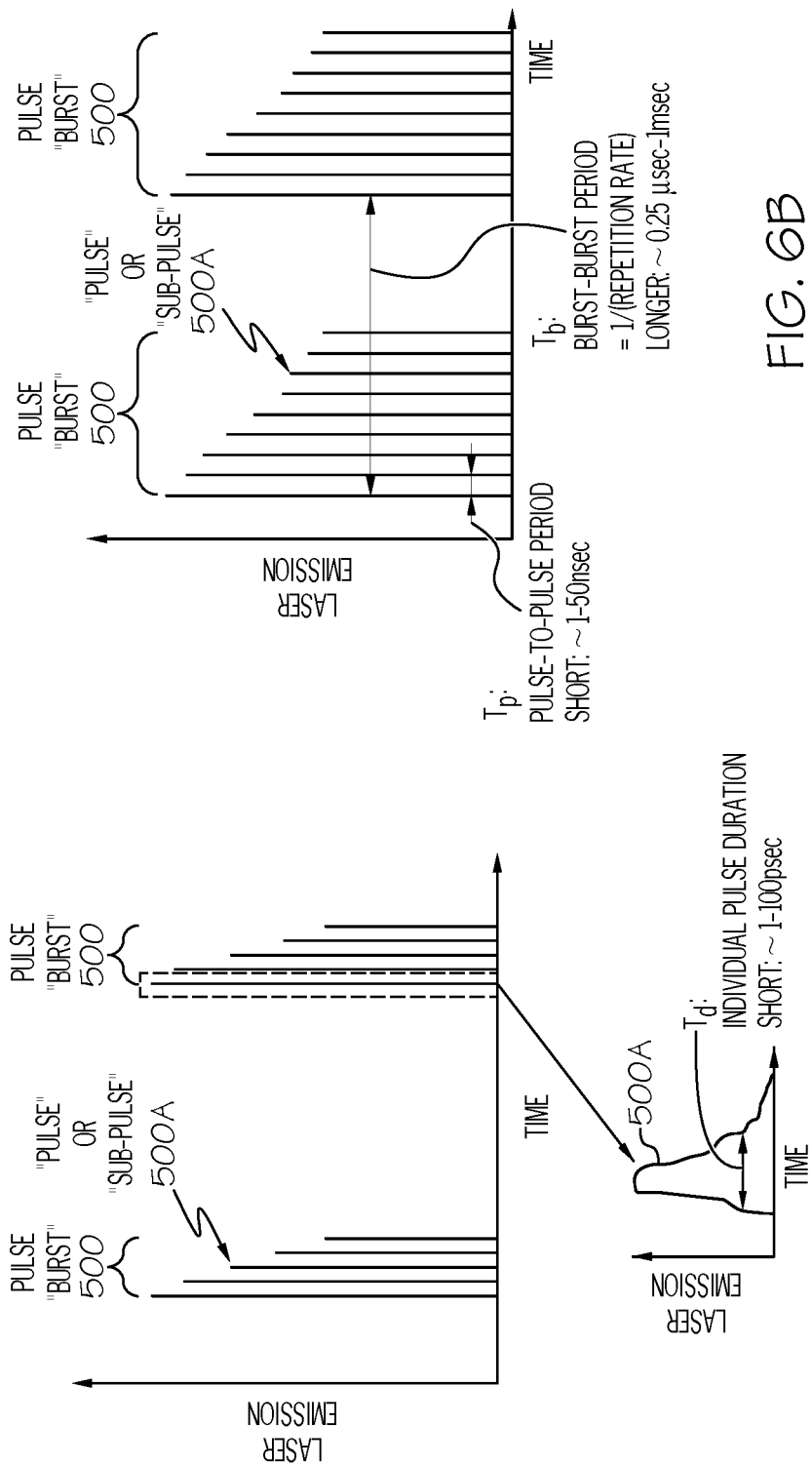

METHODS FOR LASER PROCESSING ROUGH TRANSPARENT WORKPIECES USING PULSED LASER BEAM FOCAL LINES AND A FLUID FILM

This application claims the benefit of priority to U.S. Provisional Application Ser. No. 62/649,698 filed on Mar. 29, 2018, the content of which is relied upon and incorporated herein by reference in its entirety.

BACKGROUND

Field

The present specification generally relates to apparatuses and methods for laser processing transparent workpieces, and more particularly, laser processing transparent workpieces having a rough surface.

Technical Background

The area of laser processing of materials encompasses a wide variety of applications that involve cutting, drilling, milling, welding, melting, etc. of different types of materials. Among these processes, one that is of particular interest is cutting or separating different types of transparent substrates in a process that may be utilized in the production of materials such as glass, sapphire, or fused silica for thin film transistors (TFT) or display materials for electronic devices.

From process development and cost perspectives there are many opportunities for improvement in cutting and separating glass substrates. It is of great interest to have a faster, cleaner, cheaper, more repeatable, and more reliable method of separating glass substrates than what is currently practiced in the market. Accordingly, a need exists for alternative improved methods for separating glass substrates.

SUMMARY

According to one embodiment, a method for processing a transparent workpiece includes applying a fluid film having a first refractive index to a impingement surface of the transparent workpiece that has a second refractive index. Further, a difference between the first refractive index and the second refractive index is about 0.8 or less and the impingement surface comprises a surface roughness Ra of about 0.1 µm or greater. The method also includes forming a defect in the transparent workpiece by directing a laser beam oriented along a beam pathway and output by a beam source, through the fluid film, through the impingement surface, and into the transparent workpiece such that a portion of the laser beam directed into the transparent workpiece generates an induced absorption within the transparent workpiece, the induced absorption producing the defect within the transparent workpiece.

In another embodiment, a method for processing a transparent workpiece includes applying a fluid film having a first refractive index to a impingement surface of the transparent workpiece that has a second refractive index. Further, a difference between the first refractive index and the second refractive index is about 0.8 or less and the impingement surface comprises a surface roughness Ra of about 0.1 µm or greater. The method also includes forming a contour in the transparent workpiece along a contour line, the contour including a plurality of defects in the transparent workpiece. In particular, forming the contour includes directing a pulsed laser beam oriented along a beam pathway and output by a beam source, through an aspheric optical element, through the fluid film, through the impingement surface, and into the transparent workpiece such that a portion of the pulsed laser beam directed into the transparent workpiece generates an induced absorption within the transparent workpiece, the induced absorption producing a defect within the transparent workpiece. The portion of the pulsed laser beam directed into the transparent workpiece includes a wavelength $\lambda$, an effective spot size $w_{o,eff}$, and a non-axisymmetric beam cross section that has a minimum Rayleigh range $Z_{Rx,min}$ in a cross-sectional x-direction and a minimum Rayleigh range $Z_{Ry,min}$ in a cross-sectional y-direction, and the smaller of $Z_{Rx,min}$ and $Z_{Ry,min}$ is greater than $$F_D \frac{\pi w_{0,eff}^2}{\lambda},$$

where $F_D$ is a dimensionless divergence factor is a value of 10 or greater. Further, the method includes translating the transparent workpiece and the pulsed laser beam relative to each other along the contour line, thereby laser forming the contour having the plurality of defects within the transparent workpiece along the contour line.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6A graphically depicts the relative intensity of laser pulses within an exemplary pulse burst vs. time, according to one or more embodiments described herein, according to one or more embodiments described herein; and FIG. 6B graphically depicts relative intensity of laser pulses vs. time within another exemplary pulse burst, according to one or more embodiments described herein.

DETAILED DESCRIPTION

Figure 1:
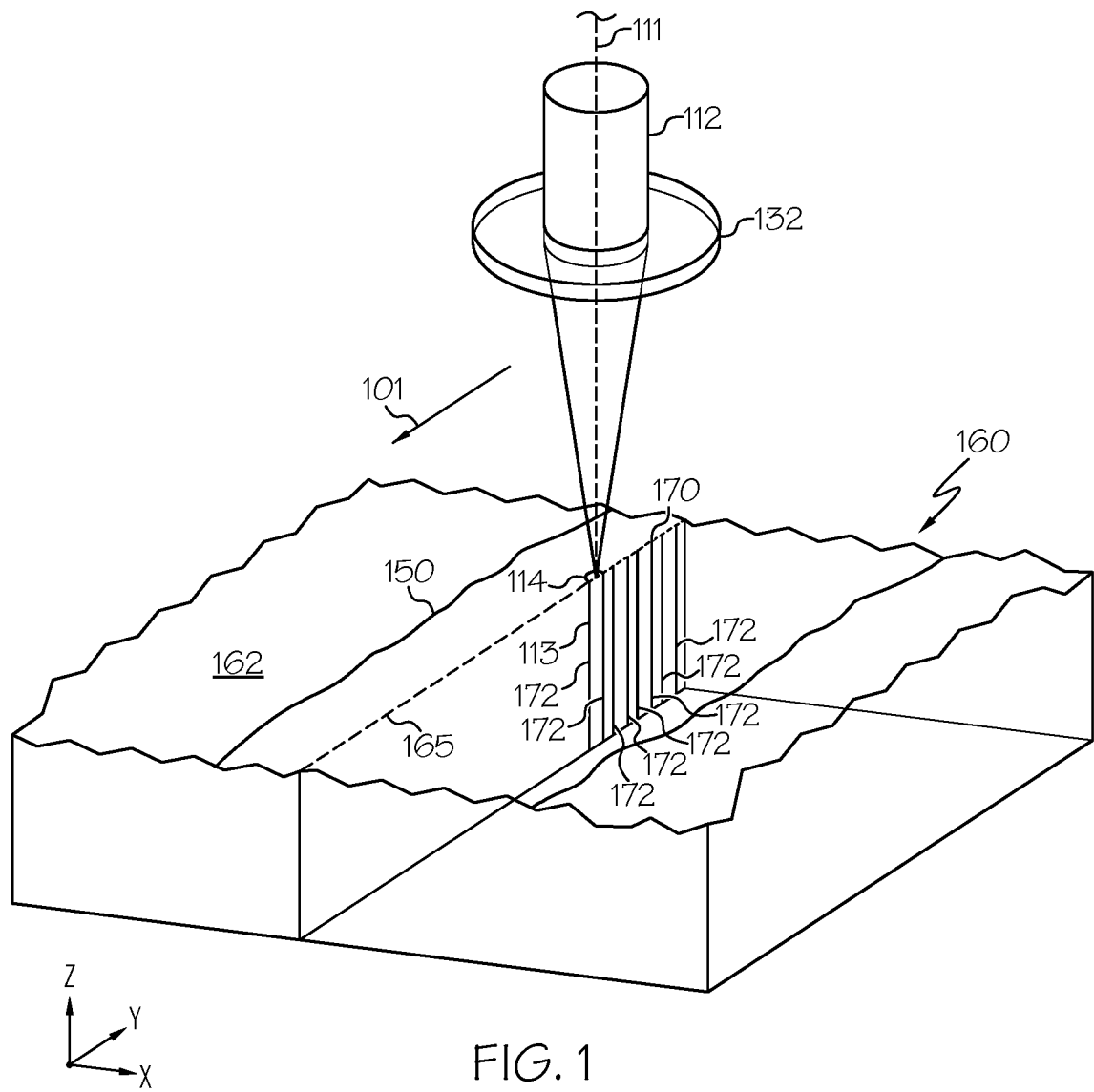
FIG. 1 schematically depicts the formation of a contour of defects in a transparent workpiece having a rough surface, according to one or more embodiments shown and described herein.

Reference will now be made in detail to embodiments of processes for laser processing transparent workpieces, such as glass workpieces, examples of which are illustrated in the accompanying drawings. Whenever possible, the same reference numerals will be used throughout the drawings to refer to the same or like parts. According to one or more embodiments described herein, a transparent workpiece may be laser processed to form a contour in the transparent workpiece comprising a series of defects along a contour line along the transparent workpiece. According to one embodiment, a pulsed laser beam is directed into the transparent workpiece to create a series of defects in the transparent workpiece thereby defining the contour.

Further, embodiments described herein may be useful for forming contours in a transparent workpiece comprising at least one rough surface. For example, a fluid film may be applied at least a portion of the rough surface along the contour line and the pulsed laser beam may be directed first through the fluid film, then through the rough surface and into the transparent workpiece. The fluid film may minimize optical alterations of the pulsed laser beam, such as reflection and dispersion that would occur upon direct irradiation of the pulsed laser beam onto the rough surface of the transparent workpiece (i.e. instances in which free-space (e.g., air), not the fluid film, is in direct contact with the rough surface). In particular, the fluid film may comprise a refractive index that is similar (e.g., having a difference of about 0.8 or less) than a refractive index of the transparent workpiece. The fluid film and the rough surface contact at a fluid-surface interface and because the fluid film and the transparent workpiece comprise similar refractive indices, optical alterations of the pulsed laser beam caused by the rough surface are minimized. Thus, transparent workpieces may be efficiently and effectively laser processed. Various embodiments of methods and apparatuses for processing a transparent workpiece will be described herein with specific reference to the appended drawings.

While the embodiments of processing a transparent workpiece having a rough surface using a fluid film may be used in a variety of contexts, the present embodiments are particularly useful for cutting transparent workpieces for use as a backlit display glass, for example, interior vehicle display glass such as the one or more display screen of an infotainment and/or navigation system. For example, when display glass is backlit, and the surface of the display glass facing the light source (i.e. the "rear" surface) is smooth, this smooth rear surfaces may cause undesirable reflections, which are distracting to the user and may impede a high quality user experience. As another example, transparent workpieces having a rough surface may be useful as picture frame glass to reduce undesirable reflections by the glass, making the glass as unnoticeable to a viewer as possible.

As used herein, "laser processing" comprises directing a laser beam onto and/or into a transparent workpiece. In some embodiments, laser processing further comprises translating the laser beam relative to the transparent workpiece, for example, along a contour line, along a modification line, or along another pathway. Examples of laser processing include using a laser beam to form a contour comprising a series of defects that extend into the transparent workpiece and using an infrared laser beam to heat the transparent workpieces of the laminate workpiece stack. Laser processing may separate the transparent workpiece along one or more desired lines of separation. However, in some embodiments, additional, non-laser steps may be utilized to separate the transparent workpieces along one or more desired lines of separation.

As used herein, "contour line," denotes a linear, angled, polygonal or curved line on a surface of a transparent workpiece that defines the path traversed by the laser beam as it is moved within the plane of the workpiece to create a corresponding contour.

As used herein, "contour," refers to a set of defects in a transparent workpiece formed by translating a laser along a contour line. As used herein, a contour refers to a virtual two dimensional shape or path in or on a substrate. Thus, while a contour itself is a virtual shape, the contour may be manifest, for example, by a fault line or a crack. A contour defines a surface of desired separation in the transparent workpiece. A contour may be formed by creating a plurality of defects in the transparent workpiece using various techniques along the contour line, for example by directed a pulsed laser beam at successive points along the contour line. Multiple contours and/or lasers with curved focal lines may be used to create complex shapes, such as a beveled surface of separation.

As used herein, a "defect" refers to a region of modified material (e.g., a region of modified refractive index relative to the bulk material), void space, crack, scratch, flaw, hole, perforation or other deformities in the transparent workpiece. These defects may be referred to, in various embodiments herein, as defect lines or damage tracks, in the workpiece. A defect line or damage track is formed by a laser beam directed onto a single position of the transparent workpiece, for a single laser pulse or multiple pulses at the same location. Translating the laser along the contour line results in multiple defects that form a contour. For a line focus laser, the defect may have a linear shape.

As used herein, the phrase "beam cross section" refers to the cross section of a laser beam along a plane perpendicular to a beam propagation direction of the laser beam, for example, along an X-Y plane when the beam propagation direction is in a Z direction.

As used herein, "beam spot" refers to a cross section of a laser beam (e.g., a beam cross section) in the impingement surface, i.e., the surface of a transparent workpiece in closest proximity to the laser optics.

As used herein, "impingement surface" refers to the surface of a transparent workpiece in closest proximity to the laser optics.

As used herein, "upstream" and "downstream" refer to the relative position of two locations or components along a beam pathway with respect to a beam source. For example, a first component is upstream from a second component if the first component is closer to the laser optics along the path traversed by the laser beam than the second component.

As used herein, "laser beam focal line," refers to pattern of interacting (e.g., crossing) light rays of a laser beam that form a linear, elongated focused region, parallel to an optical axis. The laser beam focal line comprises aberrated light rays that interact (e.g., cross) an optical axis of the laser beam at different positions along the optical axis. Furthermore, the laser beam focal lines described herein are formed using a quasi-non-diffracting beam, mathematically defined in detail below. Further, in embodiments in which a pulsed laser beam is used to form the laser beam focal line, the laser beam focal line may also be referred to as a pulsed laser beam focal line.

The phrase "transparent workpiece," as used herein, means a workpiece formed from glass, glass-ceramic or other material which is transparent, where the term "transparent," as used herein, means that the material has an optical absorption of less than 20% per mm of material depth, such as less than 10% per mm of material depth for the specified pulsed laser wavelength, or such as less than 1% per mm of material depth for the specified pulsed laser wavelength. Unless otherwise specified, the material has an optical absorption of less than about 20% per mm of material depth, The transparent workpiece may have a depth (e.g., thickness) of from about 50 microns ($\mu m$) to about 10 mm (such as from about 100 $\mu m$ to about 5 mm, or from about 0.5 mm to about 3 mm. Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments the transparent workpiece may be strengthened via thermal tempering before or after laser processing the transparent workpiece. In some embodiments, the glass may be ion-exchangeable, such that the glass composition can undergo ion-exchange for glass strengthening before or after laser processing the transparent workpiece. For example, the transparent workpiece may comprise ion exchanged and ion exchangeable glass, such as Corning Gorilla® Glass available from Corning Incorporated of Corning, N.Y. (e.g., code 2318, code 2319, and code 2320). Further, these ion exchanged glasses may have coefficients of thermal expansion (CTE) of from about 6 ppm/° C. to about 10 ppm/° C. Other example transparent workpieces may comprise EAGLE XG® and CORNING LOTUS™ available from Corning Incorporated of Corning, N.Y. Moreover, the transparent workpiece may comprise other components which are transparent to the wavelength of the laser, for example, crystals such as sapphire or zinc selenide.

In operation, a transparent workpiece may be separated into multiple portions by first forming a contour on the surface of the transparent workpiece and, thereafter, heating, for example, using an infrared laser (e.g., a $CO_2$ laser, CO laser, or the like), the surface of the transparent workpiece on the contour to create stresses in the transparent workpiece, such as thermal stresses. The stresses ultimately lead to the spontaneous separation of the workpiece along the contour. Further, in some embodiments, such as embodiment in which the transparent workpiece is strengthen (e.g., ion-exchanged) the subsequent separating step may occur a spontaneous break occurring due to stress present in the transparent workpiece, depending on the type, thickness, and structure of the transparent workpiece. For example, stress may be present in the transparent workpiece after strengthening the transparent workpiece, which may cause spontaneous separation of the transparent workpiece along the contour without further heating or mechanical separation steps.

Referring now to FIG. 1, by way of example, a transparent workpiece 160, such as a glass workpiece or a glass-ceramic workpiece, is schematically depicted undergoing processing according to the methods described herein. The transparent workpiece 160 comprises an impingement surface 162 and a fluid film 150 is disposed on the impingement surface 162. As depicted in FIG. 1, the impingement surface 162 is a rough surface. In some embodiments, the surface roughness is measured as a root mean square (RMS) roughness or as an average roughness (Ra), as is commonly done in the art. For example, the impingement surface 162 may comprise a surface roughness Ra of about 0.1 $\mu m$ or greater, such as about 0.3 $\mu m$ or greater, about 0.5 $\mu m$ or greater, about 0.75 $\mu m$ or greater, about 1 $\mu m$ or greater, about 2 $\mu m$ or greater, about 5 $\mu m$ or greater, about 10 $\mu m$ or greater, or the like.

FIG. 1 depicts the formation of a contour 170 in the transparent workpiece 160, which may be formed by translating a pulsed laser beam 112 and the transparent workpiece 160 relative to one another such that the pulsed laser beam 112 translates relative to the transparent workpiece 160 in a translation direction 101. FIG. 1 depicts the pulsed laser beam 112 along a beam pathway 111 and oriented such that the pulsed laser beam 112 may be directed first through the fluid film 150, then through the impingement surface 162 and into the transparent workpiece 160. FIG. 1 depicts that the pulsed laser beam 112 forms a beam spot 114 projected onto impingement surface 162 of the transparent workpiece 160.

In some embodiments, the pulsed laser beam 112 may be focused into a pulsed laser beam focal line 113 within the transparent workpiece 160, and in some embodiments, also within the fluid film 150, using an aspheric optical element 120 (FIG. 5), for example, an axicon and one or more lenses (e.g., a first lens 130 and a second lens 132, as described below and depicted in FIG. 5). In some embodiments, the pulsed laser beam focal line 113 is a portion of a quasi-non-diffracting beam, as defined in more detail below. Moreover, while embodiments described herein describe the use of a quasi-non-diffracting pulsed laser beam, it should be understood that the methods of laser processing a transparent workpiece having a rough surface using a fluid film may be used in laser processing techniques using any type of laser beams, for example, other pulsed laser beams (e.g., Gaussian beams, or the like) and other non-pulsed laser beams.

Referring still to FIG. 1, the contour 170 extends along a contour line 165, which delineates a line of intended separation along the impingement surface 162, along which the transparent workpiece 160 may be separated into two or more portions. The contour 170 comprises a plurality of defects 172 that extend into the transparent workpiece 160, for example, extend from the impingement surface 162 into the transparent workpiece 160, and establish a path for separation of the transparent workpiece 160. Further, the fluid film 150 may be disposed on the contour line 165, at least during formation of the contour 170. For example, the fluid film 150 may be applied to the impingement surface 162 of the transparent workpiece 160 at least along the contour line 165.

The pulsed laser beam 112 (with a beam spot 114 projected onto the transparent workpiece 160) may be directed through the fluid film 150 and into the transparent workpiece 160 (e.g., condensed into a high aspect ratio line focus that penetrates through at least a portion of the thickness of the transparent workpiece 160). This forms the pulsed laser beam focal line 113. Further, the beam spot 114 is an example cross section of the pulsed laser beam focal line 113 and when the pulsed laser beam focal line 113 irradiates the transparent workpiece 160 (forming the beam spot 114), the pulsed laser beam focal line 113 penetrates at least a portion of the transparent workpiece 160.

In operation, the pulsed laser beam 112 may be translated relative to the transparent workpiece 160 (e.g., in the translation direction 101) to form the plurality of defects 172 of the contour 170. Directing or localizing the pulsed laser beam 112 into the transparent workpiece 160 generates an induced absorption within the transparent workpiece 160 and deposits enough energy to break chemical bonds in the transparent workpiece 160 at spaced locations along the contour line 165 to form the defects 172 of the contour 170. According to one or more embodiments, the pulsed laser beam 112 may be translated across the transparent workpiece 160 by motion of the transparent workpiece 160 (e.g., motion of a translation stage 180 (FIG. 5) coupled to the transparent workpiece 160), motion of the pulsed laser beam 112 (e.g., motion of the pulsed laser beam focal line 113), or motion of both the transparent workpiece 160 and the pulsed laser beam focal line 113. By translating the pulsed laser beam focal line 113 relative to the transparent workpiece 160, the plurality of defects 172 may be formed in the transparent workpiece 160.

Figure 2A:
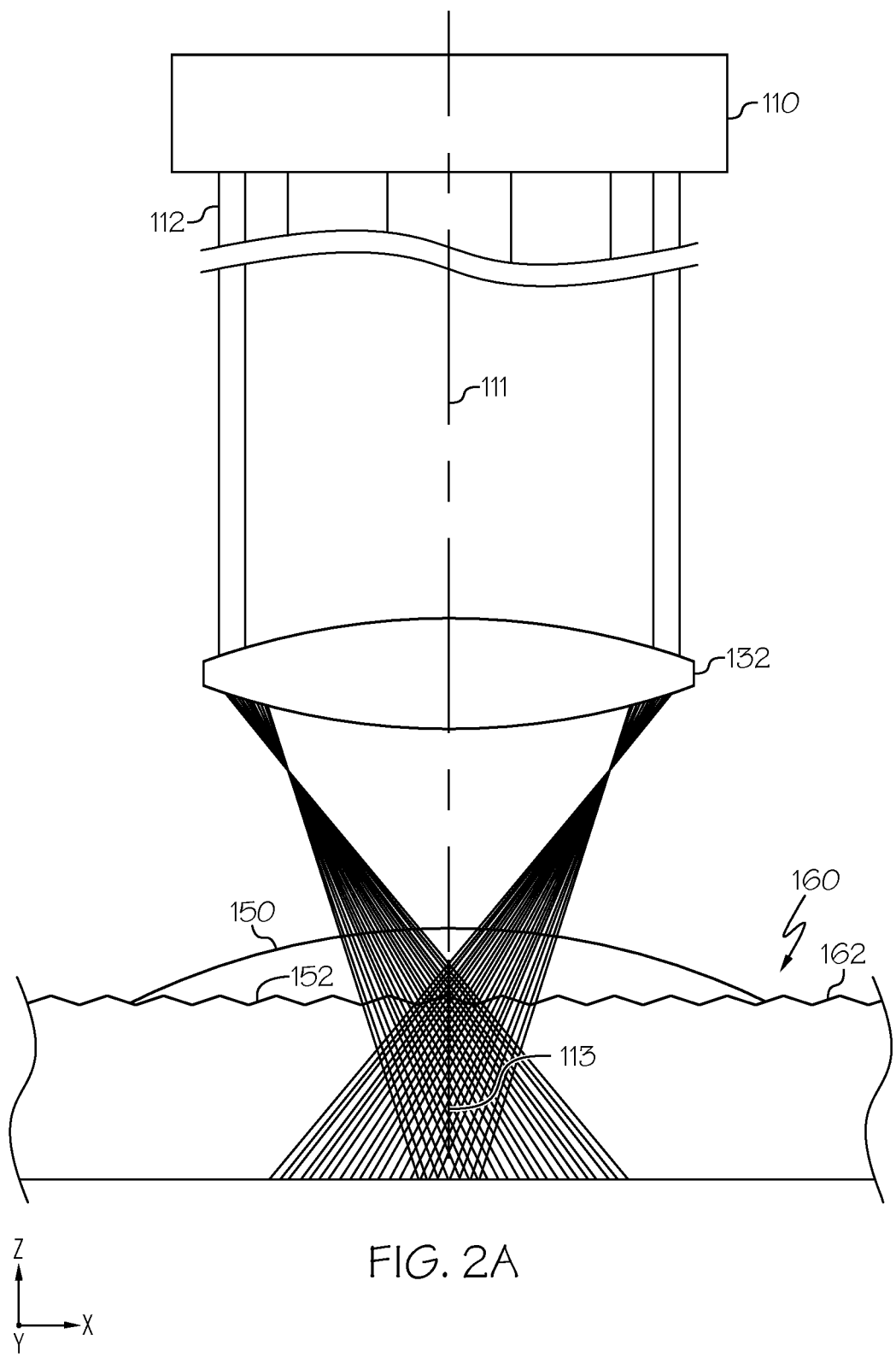
FIG. 2A schematically depicted a pulsed laser beam focal line irradiating a rough surface of a transparent workpiece having a fluid film disposed thereon, according to one or more embodiments shown and described herein.
Figure 2B:
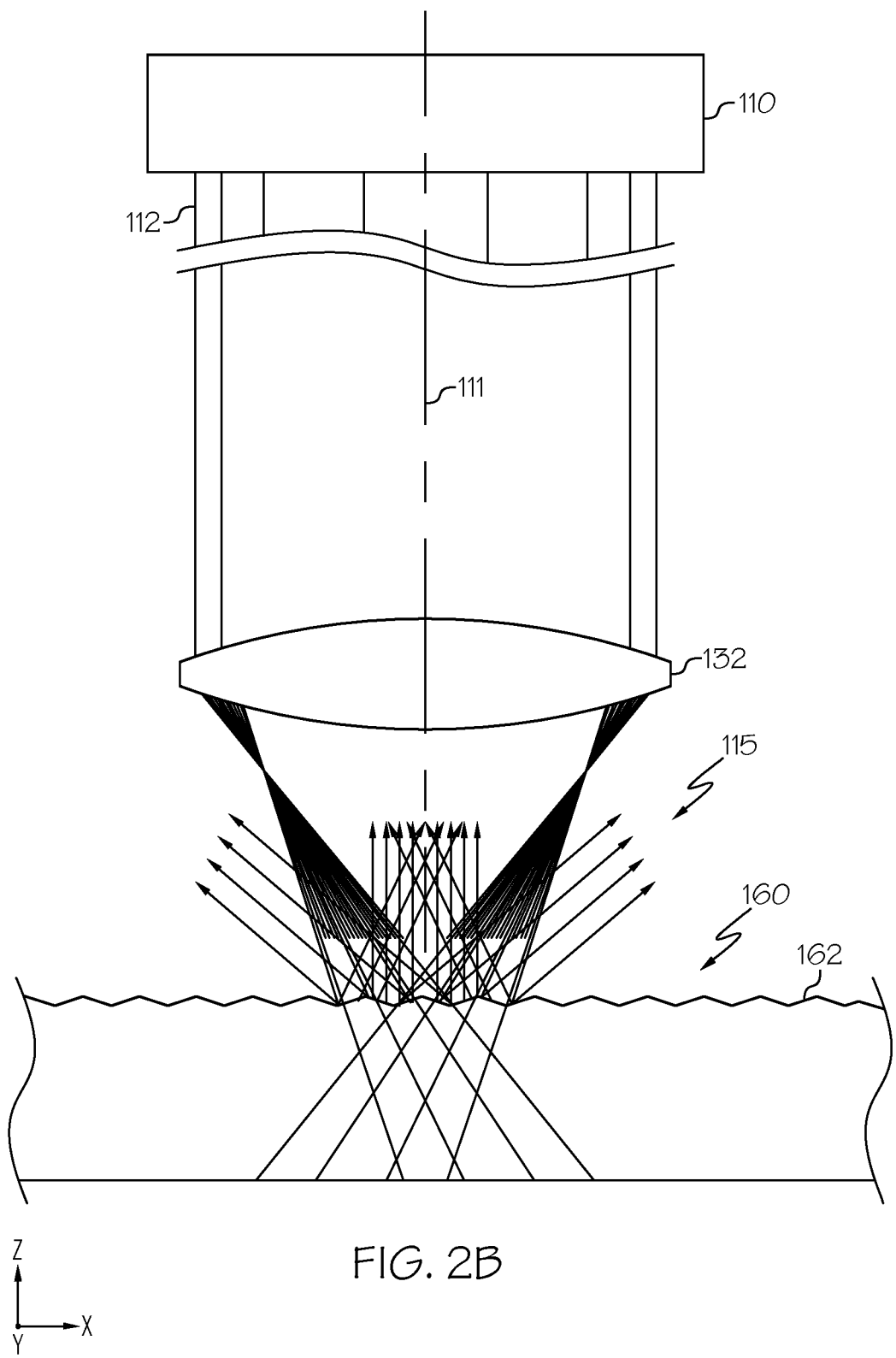
FIG. 2B schematically depicts a pulsed laser beam focal line directly irradiating of a rough surface of a transparent workpiece, according to one or more embodiments shown and described herein.

Referring now to FIGS. 2A and 2B, the pulsed laser beam 112 is depicted irradiating the impingement surface 162 of the transparent workpiece 160. In particular, FIG. 2A depicts an embodiment in which the fluid film 150 is disposed on the impingement surface 162 of the transparent workpiece 160 and pulsed laser beam 112 irradiates the fluid film 150 and thereafter irradiates the impingement surface 162. Further, FIG. 2B depicts an embodiment without the fluid film 150 such that the pulsed laser beam 112 directly irradiates the impingement surface 162, without first traversing the fluid film 150.

As depicted in FIG. 2A, the fluid film 150 contacts the impingement surface 162 of the transparent workpiece 160 at a fluid-surface interface 152. The fluid film 150 comprises a first refractive index and the transparent workpiece 160 comprises a second refractive index. The first refractive index and the second refractive index may be similar such that when the pulsed laser beam 112 irradiates the fluid-surface interface 152, reflection and dispersion are minimized. While not intending to be limited by theory because the transparent workpiece 160 and the fluid film 150 comprise similar (and in some embodiments, equal) refractive indices, the topography of the impingement surface 162 at most negligibly affects the pulsed laser beam 112 because when light irradiates the fluid-surface interface 152. While not intending to be limited by theory, when the pulsed laser beam 112 irradiates and traverses the fluid-surface interface 152, the pulsed laser beam 112 behaves as if it was traversing a single material and is thus unaffected or minimally affected by the roughness of the impingement surface 162. Further, while the interface of the fluid film 150 and the air (i.e. the location where the pulsed laser beam 112 first irradiates the fluid film 150) may cause the pulsed laser beam 112 to refract, this refraction can be repeatably taken into account and compensated for in view of Snell's Law using an optical assembly (e.g., the optical assembly 100 of FIG. 5).

The fluid film 150 described herein may comprise any non-gaseous fluid. In some embodiments, the fluid film 150 comprises water and in other embodiments, the fluid film 150 comprises an index matching material, for example, a gel, an epoxy, a polymer, an immersion oil, such as cedar wood oil, or the like. In some embodiments, the fluid film 150 comprises a Newtonian fluid and in other embodiments, the fluid film 150 comprises a non-Newtonian fluid. While it is contemplated that the fluid film 150 comprises any refractive index that is about 0.8 or less from the refractive index of the transparent workpiece 160 (i.e. the fluid film 150 may be tailored for a specific transparent workpiece 160), in some embodiments, the fluid film 150 comprises a refractive index (i.e. the first refractive index) of from about 1 to about 2, for example, from about 1.1 to about 1.9, 1.2 to about 1.8, 1.3 to about 1.7, about 1.4 to about 1.6, 1.45 to about 1.55, or the like. such as 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.2, 1.21, 1.22, 1.23, 1.24, 1.25, 1.26, 1.27, 1.28, 1.29, 1.3, 1.31, 1.32, 1.33 (i.e. the refractive index of water), 1.34, 1.35, 1.36, 1.37, 1.38, 1.39, 1.4, 1.41, 1.42, 1.43, 1.44, 1.45, 1.46, 1.47, 1.48, 1.49, 1.5, 1.51, 1.52, 1.53, 1.54, 1.55, 1.56, 1.57, 1.58, 1.59, 1.6, 1.61, 1.62, 1.63, 1.64, 1.65, 1.66, 1.67, 1.68, 1.69, 1.7, 1.71, 1.72, 1.73, 1.74, 1.75, 1.76, 1.77, 1.78, 1.79, 1.8, 1.81, 1.82, 1.83, 1.84, 1.85, 1.86, 1.87, 1.88, 1.89, 1.9, 1.91, 1.92, 1.93, 1.94, 1.95, 1.96, 1.97, 1.98, 1.99, or the like.

As stated above, the transparent workpiece 160 may comprise a glass, sapphire, fused silica, or combinations thereof, such as an alkali aluminosilicate glass material. Further, the transparent workpiece 160 comprises a refractive index (i.e., the second refractive index) of about 1.3 to about 1.7, for example, from about 1.35 to about 1.65, about 1.4 to about 1.6, about 1.45 to about 1.55 or the like, such as 1.31, 1.32, 1.33, 1.34, 1.35, 1.36, 1.37, 1.38, 1.39, 1.4, 1.41, 1.42, 1.43, 1.44, 1.45, 1.46, 1.47, 1.48, 1.49, 1.5, 1.51, 1.52, 1.53, 1.54, 1.55, 1.56, 1.57, 1.58, 1.59, 1.6, 1.61, 1.62, 1.63, 1.64, 1.65, 1.66, 1.67, 1.68, 1.69, or the like. In some embodiments, the difference between the first refractive index and the second refractive index is about 0.8 or less, for example, about 0.75 or less, about 0.7 or less, about 0.65 or less, about 0.6 or less, about 0.55 or less, about 0.5 or less, about 0.45 or less, about 0.4 or less, about 0.35 or less, about 0.3 or less, about 0.25 or less, about 0.2 or less, about 0.15 or less, about 0.1 or less, about 0.09 or less, about 0.08 or less, about 0.07 or less, about 0.06 or less, about 0.05 or less, about 0.04 or less, about 0.03 or less, about 0.02 or less, about 0.01 or less, about 0.005 or less, or the like. Further, in some embodiments, the first refractive index and the second refractive index are equal.

Referring now to FIG. 2B, the pulsed laser beam 112 is depicted directly irradiating the impingement surface 162 without the presence of the fluid film 150. As shown in FIG. 2B, when the pulsed laser beam 112 directly irradiates the impingement surface 162, the rough topography of the impingement surface 162 reflects and/or disperses at least a portion of the pulsed laser beam 112 such that the pulsed laser beam focal line 113 is not formed in the transparent workpiece 160 or the pulsed laser beam focal line 113 is formed but comprises unsatisfactory power, length, positioning, focus, or the like, to form the defects 172 of the contour 170. In the embodiments depicted in FIG. 2B, a portion of the pulsed laser beam 112 is reflected off the impingement surface 162 as reflected light 115 and another portion of the pulsed laser beam 112 enters the transparent workpiece 160 but fails to form the pulsed laser beam focal line 113 and thus fails to form a defect 172 in the transparent workpiece 160.

Figure 3A:
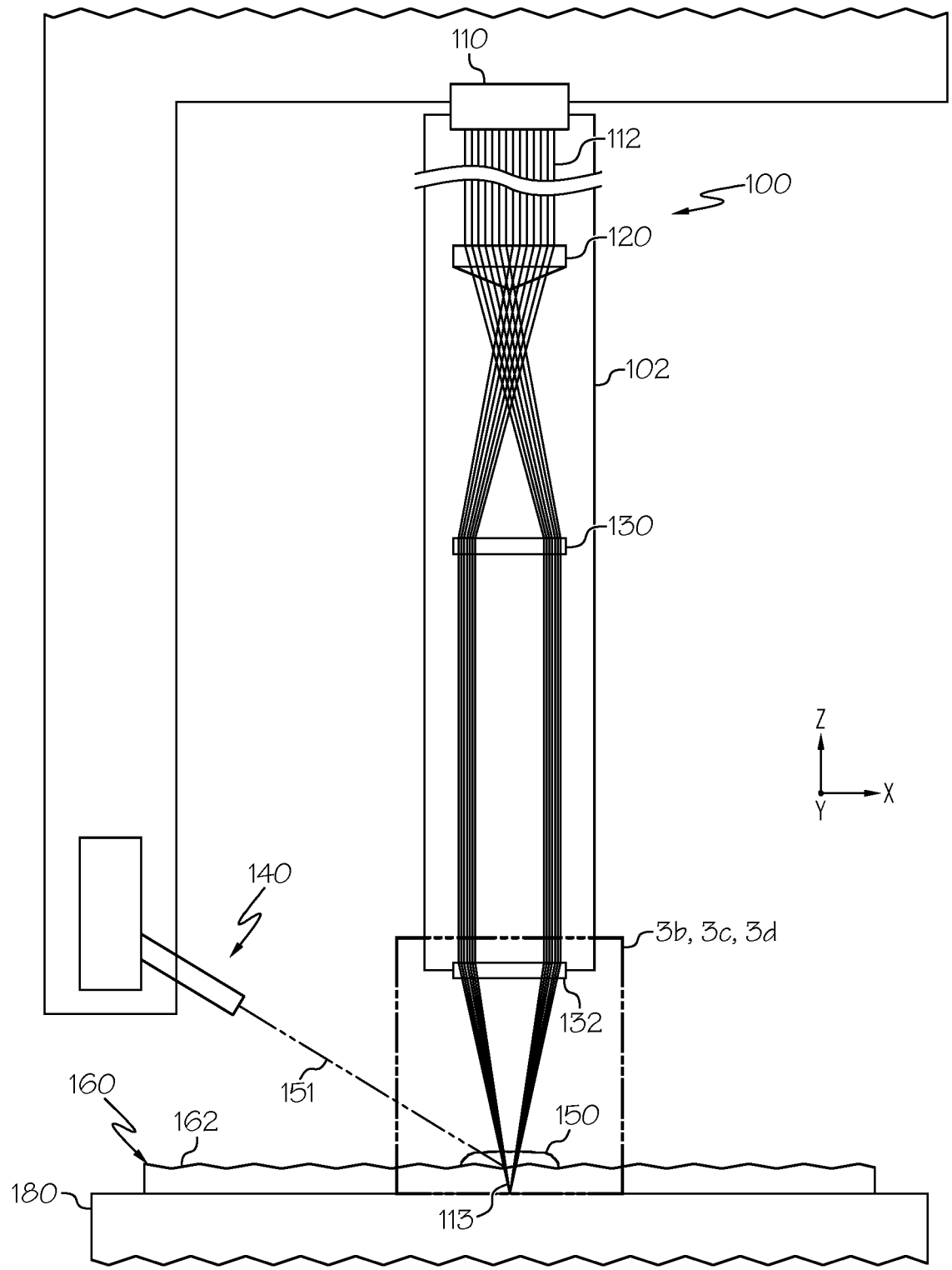
FIG. 3A schematically depicts an optical assembly for laser processing a transparent workpiece and a fluid output mechanism for applying a fluid film to the transparent workpiece, according to one or more embodiments shown and described herein.
Figure 3B:
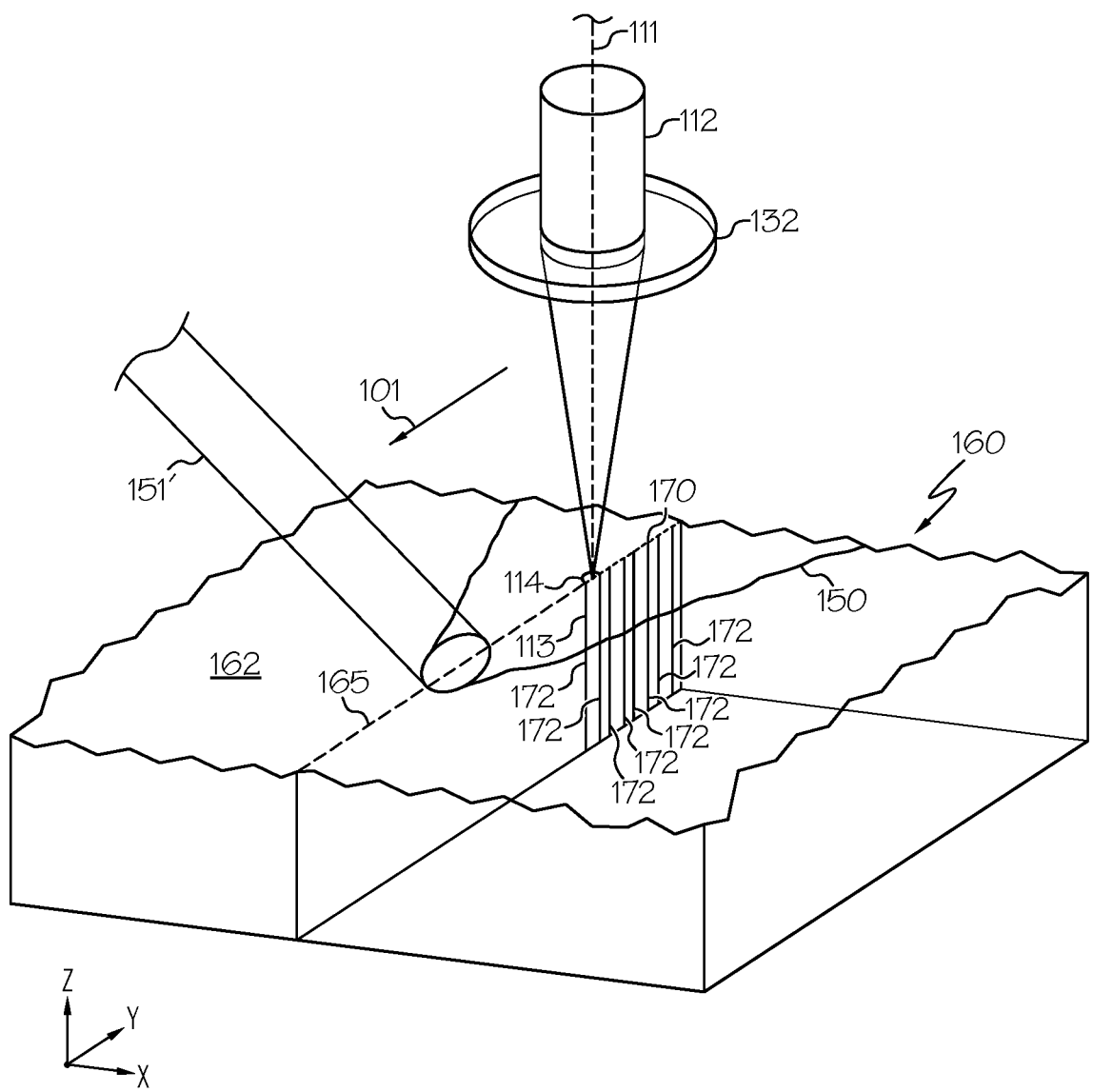
FIG. 3B schematically depicts an embodiment of laser processing a transparent workpiece and applying a fluid film to a transparent workpiece using a fluid jet, according to one or more embodiments shown and described herein.
Figure 3C:
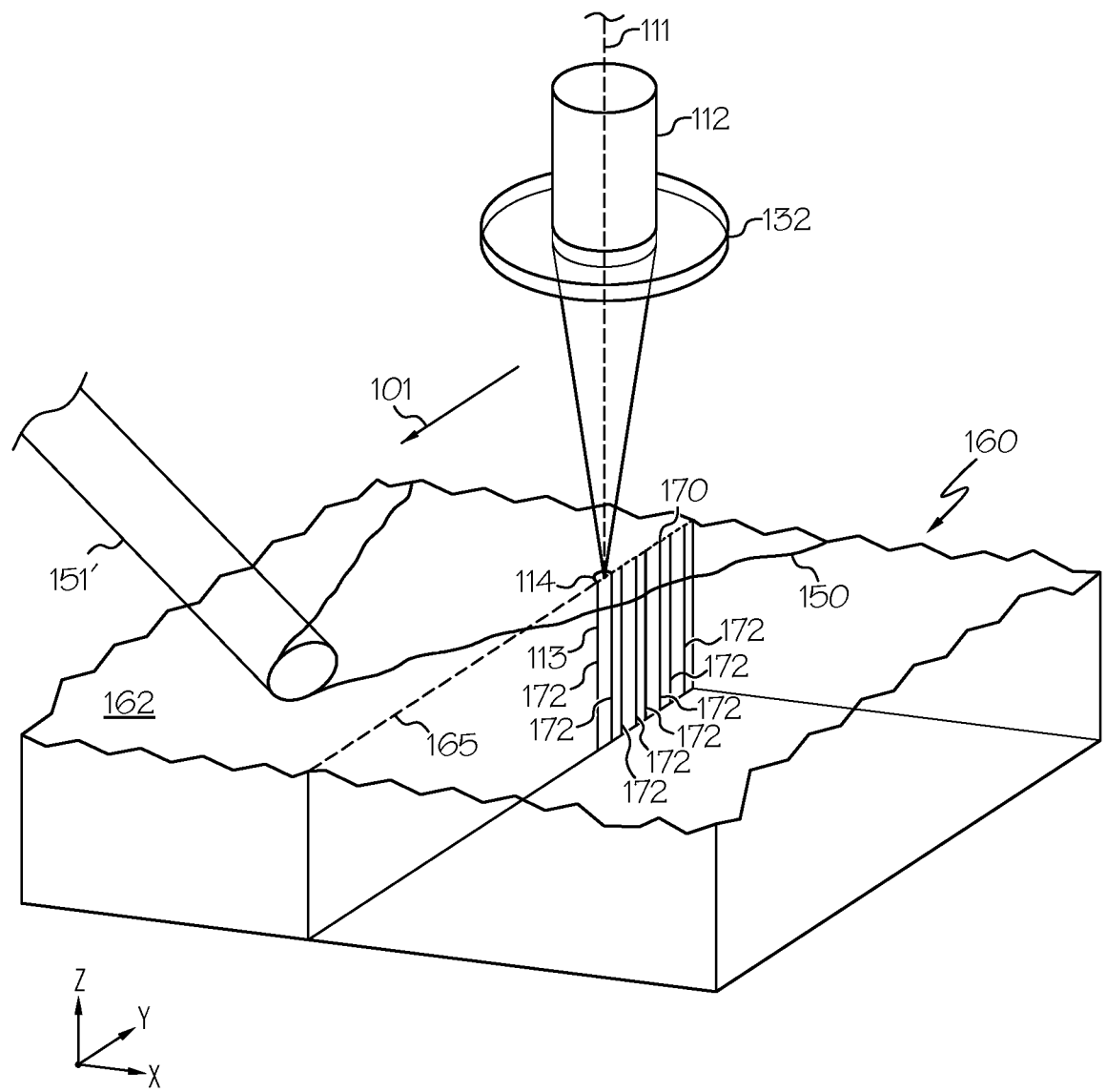
FIG. 3C schematically depicts another embodiments of laser processing a transparent workpiece and applying a fluid film to a transparent workpiece using a fluid jet, according to one or more embodiments shown and described herein.
Figure 3D:
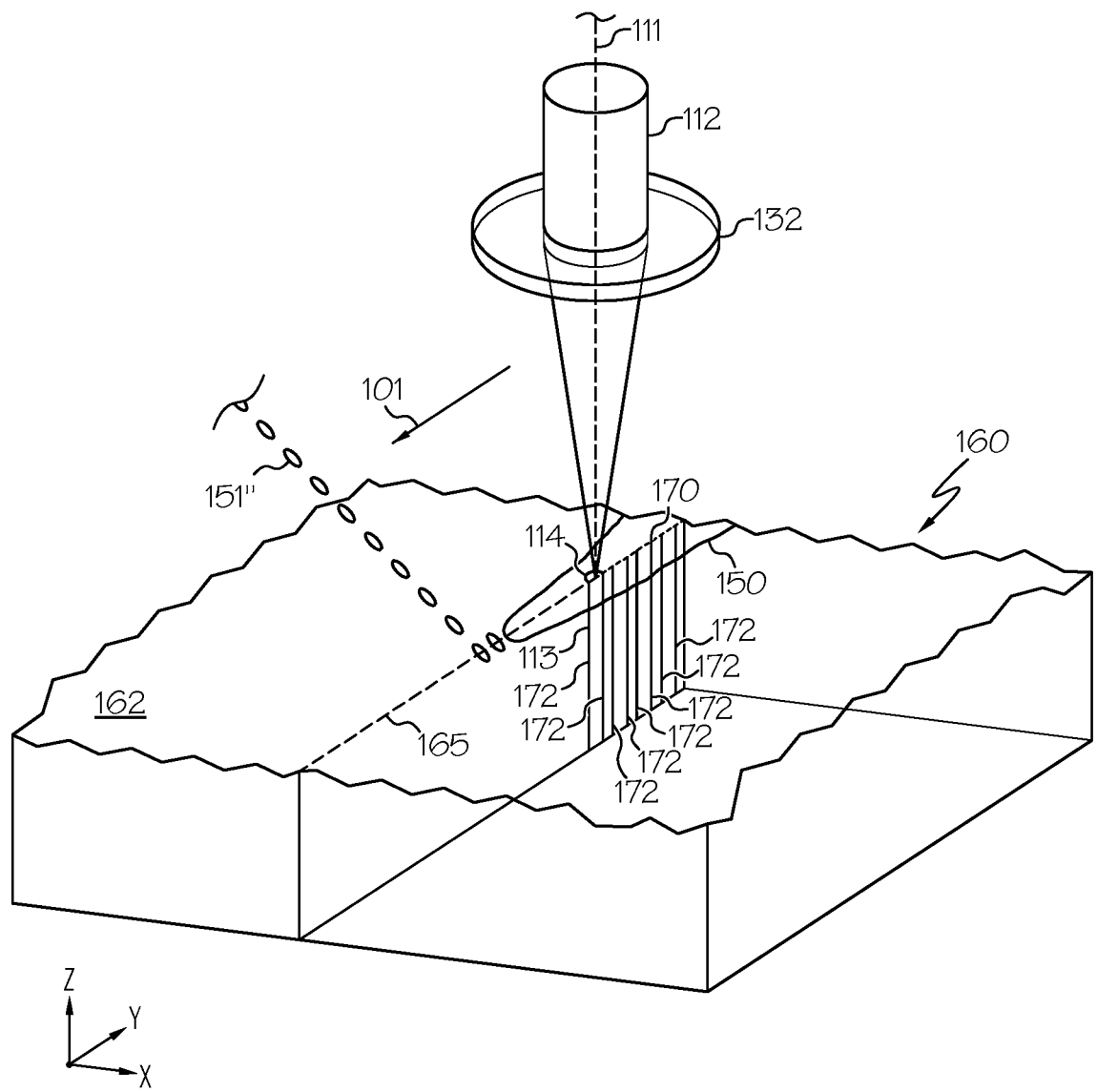
FIG. 3D schematically depicts an embodiment of laser processing a transparent workpiece and applying a fluid film to a transparent workpiece using fluid droplets, according to one or more embodiments shown and described herein.
Figure 4:
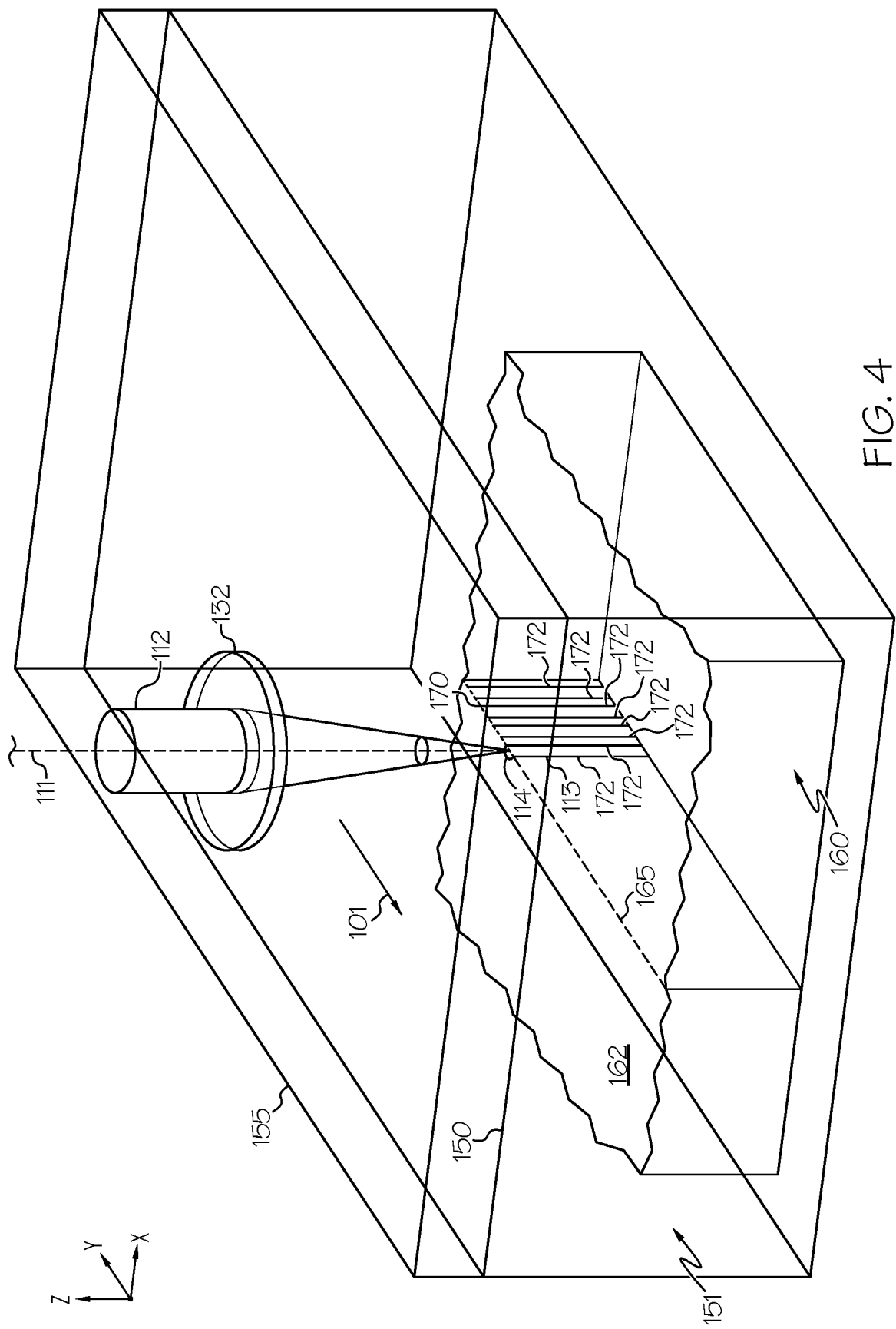
FIG. 4 schematically depicts an optical assembly for laser processing a transparent workpiece and a fluid container for submerging at least a surface of the transparent workpiece in a fluid, according to one or more embodiments shown and described herein.

Referring now to FIGS. 3A-4, the fluid film 150 may be applied to the impingement surface 162 of the transparent workpiece 160 using a variety of methods and mechanisms. For example, as depicted in FIG. 3A, a fluid 151 may be directed from a fluid output mechanism 140 onto the impingement surface 162 of the transparent workpiece 160. Further, FIGS. 3B-3D depict different embodiments of directing the fluid 151 output by the fluid output mechanism 140 onto the impingement surface 162. For example, in the embodiments depicted in FIGS. 3B and 3C, the fluid 151 is directed onto the impingement surface 162 as a fluid jet 151', which may impinge the impingement surface 162 along the contour line 165 (FIG. 3B) or may impinge the impingement surface 162 at a location apart from the contour line 165. Further, as depicted in FIG. 3D, in some embodiments, the fluid 151 is directed onto the impingement surface 162 as a plurality of fluid droplets 151", for example, along the contour line 165. In operation, each fluid droplet of the plurality of fluid droplets 151" may be deposited on the impingement surface 162 in a spaced relationship having a spacing such that adjacent fluid droplets will cohere together to form the fluid film 150. While not intending to be limited by theory, this cohesion of adjacent fluid droplets is caused by the surface tension of each fluid droplet.

Referring now to FIG. 4, in some embodiments, the fluid film 150 may be applied to the impingement surface 162 by submerging the impingement surface 162 in the fluid 151, thereby forming the fluid film 150 on the impingement surface 162. For example, as depicted in FIG. 4, the fluid 151 may be housed in a fluid container 155 sized such that at least the impingement surface 162 is submergible therein, for example, by submerging the entire transparent workpiece 160 in the fluid 151. Further, in some embodiments, it may be desirable to submerge the impingement surface 162 to the minimal depth necessary to form the fluid film 150 thereon, thus minimizing the refractive effects of the fluid film 150.

Referring again to FIGS. 1 and 2A, the pulsed laser beam 112 used to form the defects 172 further has an intensity distribution I(X,Y,Z), where Z is axis along which the beam propagation direction of the pulsed laser beam 112 follows, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the pulsed laser beam 112 in a cross-sectional plane may be referred to as a cross-sectional intensity distribution.

The pulsed laser beam 112 at the beam spot 114 or other cross sections may comprise a quasi-non-diffracting beam, for example, a beam having low beam divergence as mathematically defined below, by propagating the pulsed laser beam 112 (e.g., outputting the pulsed laser beam 112, such as a Gaussian beam, using a beam source 110) through an aspheric optical element 120, as described in more detail below with respect to the optical assembly 100 depicted in FIG. 5. Beam divergence refers to the rate of enlargement of the beam cross section in the direction of beam propagation (i.e., the Z direction from the beam source 110 to the transparent workpiece 160). One example beam cross section discussed herein is the beam spot 114 of the pulsed laser beam 112 projected onto the transparent workpiece 160. Example quasi non-diffracting beams include Gauss-Bessel beams and Bessel beams.

Diffraction is one factor that leads to divergence of pulsed laser beams 112. Other factors include focusing or defocusing caused by the optical systems forming the pulsed laser beams 112 or refraction and scattering at interfaces. Pulsed laser beams 112 for forming the defects 172 of the contour 170 may have beam spots 114 with low divergence and weak diffraction. The divergence of the pulsed laser beam 112 is characterized by the Rayleigh range $Z_R$, which is related to the variance $\sigma^2$ of the intensity distribution and beam propagation factor $M^2$ of the pulsed laser beam 112. In the discussion that follows, formulas will be presented using a Cartesian coordinate system. Corresponding expressions for other coordinate systems are obtainable using mathematical techniques known to those of skill in the art. Additional information on beam divergence can be found in the articles entitled "New Developments in Laser Resonators" by A. E. Siegman in SPIE Symposium Series Vol. 1224, p. 2 (1990) and "$M^2$ factor of Bessel-Gauss beams" by R. Borghi and M. Santarsiero in Optics Letters, Vol. 22(5), 262 (1997), the disclosures of which are incorporated herein by reference in their entirety. Additional information can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

The spatial coordinates of the centroid of the intensity profile of the pulsed laser beam 112 having a time-averaged intensity profile I(x, y, z) are given by the following expressions:

$$\overline{x}(z) = \frac{\int_{-\infty}^{\infty}\int_{-\infty}^{\infty} xI(x, y, z)dxdy}{\int_{-\infty}^{\infty}\int_{-\infty}^{\infty} I(x, y, z)dxdy} \quad (1)$$

$$\overline{y}(z) = \frac{\int_{-\infty}^{\infty}\int_{-\infty}^{\infty} yI(x, y, z)dxdy}{\int_{-\infty}^{\infty}\int_{-\infty}^{\infty} I(x, y, z)dxdy} \quad (2)$$

These are also known as the first moments of the Wigner distribution and are described in Section 3.5 of ISO 11146-2:2005(E). Their measurement is described in Section 7 of ISO 11146-2:2005(E).

Variance is a measure of the width, in the cross-sectional (X-Y) plane, of the intensity distribution of the pulsed laser beam 112 as a function of position z in the direction of beam propagation. For an arbitrary laser beam, variance in the X-direction may differ from variance in the Y-direction. We let $\sigma_x^2(z)$ and $\sigma_y^2(z)$ represent the variances in the X-direction and Y-direction, respectively. Of particular interest are the variances in the near field and far field limits. We let $\sigma_{0x}^2(z)$ and $\sigma_{0y}^2(z)$ represent variances in the X-direction and Y-direction, respectively, in the near field limit, and we let $\sigma_{\infty x}^2(z)$ and $\sigma_{\infty y}^2(z)$ represent variances in the X-direction and Y-direction, respectively, in the far field limit. For a laser beam having a time-averaged intensity profile I(x, y, z) with Fourier transform $\tilde{I}(v_x, v_y)$ (where $v_x$ and $v_y$ are spatial frequencies in the X-direction and Y-direction, respectively), the near field and far field variances in the X-direction and Y-direction are given by the following expressions:

$$\sigma_{0x}^2(z) = \frac{\int_{-\infty}^{\infty}\int_{-\infty}^{\infty} x^2 I(x, y, z) dx dy}{\int_{-\infty}^{\infty}\int_{-\infty}^{\infty} I(x, y, z) dx dy} \quad (3)$$

$$\sigma_{0y}^2(z) = \frac{\int_{-\infty}^{\infty}\int_{-\infty}^{\infty} y^2 I(x, y, z) dx dy}{\int_{-\infty}^{\infty}\int_{-\infty}^{\infty} I(x, y, z) dx dy} \quad (4)$$

$$\sigma_{\infty x}^2 = \frac{\int_{-\infty}^{\infty}\int_{-\infty}^{\infty} v_x^2 \tilde{I}(v_x, v_y) dv_x dv_y}{\int_{-\infty}^{\infty}\int_{-\infty}^{\infty} \tilde{I}(v_x, v_y) dv_x dv_y} \quad (5)$$

$$\sigma_{\infty y}^2 = \frac{\int_{-\infty}^{\infty}\int_{-\infty}^{\infty} v_y^2 \tilde{I}(v_x, v_y) dv_x dv_y}{\int_{-\infty}^{\infty}\int_{-\infty}^{\infty} \tilde{I}(v_x, v_y) dv_x dv_y} \quad (6)$$

The variance quantities $\sigma_{0x}^2(z)$, $\sigma_{0y}^2(z)$, $\sigma_{\infty x}^2$, and $\sigma_{\infty y}^2$ are also known as the diagonal elements of the Wigner distribution (see ISO 11146-2:2005(E)). These variances can be quantified for an experimental laser beam using the measurement techniques described in Section 7 of ISO 11146-2:2005(E). In brief, the measurement uses a linear unsaturated pixelated detector to measure I(x, y) over a finite spatial region that approximates the infinite integration area of the integral equations which define the variances and the centroid coordinates. The appropriate extent of the measurement area, background subtraction and the detector pixel resolution are determined by the convergence of an iterative measurement procedure described in Section 7 of ISO 11146-2:2005(E). The numerical values of the expressions given by equations 1-6 are calculated numerically from the array of intensity values as measured by the pixelated detector.

Through the Fourier transform relationship between the transverse amplitude profile $\tilde{u}(x, y, z)$ for an arbitrary optical beam (where $I(x, y, z) \equiv |\tilde{u}(x, y, z)|^2$) and the spatial-frequency distribution $\tilde{P}(v_x, v_y, z)$ for an arbitrary optical beam (where $\tilde{I}(v_x, v_y) \equiv |\tilde{P}(v_x, v_y, z)|^2$), it can be shown that:

$$\sigma_x^2(z) = \sigma_{0x}^2(z_{0x}) + \lambda^2 \sigma_{\infty x}^2 (z - z_{0x})^2 \quad (7)$$

$$\sigma_y^2(z) = \sigma_{0y}^2(z_{0y}) + \lambda^2 \sigma_{\infty y}^2 (z - z_{0y})^2 \quad (8)$$

In equations (7) and (8), $\sigma_{0x}^2(z_{0x})$ and $\sigma_{0y}^2(z_{0y})$ are minimum values of $\sigma_{0x}^2(z)$ and $\sigma_{0y}^2(z)$, which occur at waist positions $z_{0x}$ and $z_{0y}$ in the x-direction and y-direction, respectively, and $\lambda$ is the wavelength of the pulsed laser beam 112. Equations (7) and (8) indicate that $\sigma_x^2(z)$ and $\sigma_y^2(z)$ increase quadratically with z in either direction from the minimum values associated with the waist position of the pulsed laser beam 112 (e.g., the waist portion of the pulsed laser beam focal line 113). Further, in the embodiments described herein comprising a beam spot 114 that is axi-symmetric and thereby comprises an axisymmetric intensity distribution I(x,y), $\sigma_x^2(z) = \sigma_y^2(z)$ and in some embodiments comprising a beam spot 114 that is non-axisymmetric and thereby comprises a non-axisymmetric intensity distribution I(x,y), $\sigma_x^2(z) \neq \sigma_y^2(z)$, i.e., $\sigma_x^2(z) < \sigma_y^2(z)$ or $\sigma_x^2(z) > \sigma_y^2(z)$.

Equations (7) and (8) can be rewritten in terms of a beam propagation factor $M^2$, where separate beam propagations factors $M_x^2$ and $M_y^2$ for the x-direction and the y-direction are defined as:

$$M_x^2 = 4\pi \sigma_{0x} \sigma_{\infty x} \quad (9)$$

$$M_y^2 = 4\pi \sigma_{0y} \sigma_{\infty y} \quad (10)$$

Rearrangement of Equations (9) and (10) and substitution into Equations (7) and (8) yields:

$$\sigma_x^2(z) = \sigma_{0x}^2(z_{0x}) + \frac{\lambda^2 M_x^4}{(4\pi\sigma_{0x})^2}(z - z_{0x})^2 \quad (11)$$

$$\sigma_y^2(z) = \sigma_{0y}^2(z_{0y}) + \frac{\lambda^2 M_y^4}{(4\pi\sigma_{0y})^2}(z - z_{0y})^2 \quad (12)$$

which can be rewritten as:

$$\sigma_x^2(z) = \sigma_{0x}^2(z_{0x})\left[1 + \frac{(z - z_{0x})^2}{Z_{Rx}^2}\right] \quad (13)$$

$$\sigma_y^2(z) = \sigma_{0y}^2(z_{0y})\left[1 + \frac{(z - z_{0y})^2}{Z_{Ry}^2}\right] \quad (14)$$

where the Rayleigh ranges $Z_{Rx}$ and $Z_{Ry}$ in the x-direction and y-direction, respectively, are given by:

$$Z_{Rx} = \frac{4\pi \sigma_{0x}^2}{M_x^2 \lambda} \quad (15)$$

$$Z_{Ry} = \frac{4\pi \sigma_{0y}^2}{M_y^2 \lambda} \quad (16)$$

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. Further, in the embodiments described herein comprising a beam spot 114 that is axisymmetric and thereby comprises an axisymmetric intensity distribution I(x,y), $Z_{Rx} = Z_{Ry}$, and in the embodiments described herein comprising a beam spot 114 that is non-axisymmetric and thereby comprises a non-axisymmetric intensity distribution I(x,y), $Z_{Rx} \neq Z_{Ry}$, i.e., $Z_{Rx} < Z_{Ry}$ or $Z_{Rx} > Z_{Ry}$. The Rayleigh range can also be observed as the distance along the beam axis at which the optical intensity decays to one half of its value observed at the beam waist location (location of maximum intensity). Laser beams with large Rayleigh ranges have low divergence and expand more slowly with distance in the beam propagation direction than laser beams with small Rayleigh ranges.

The formulas above can be applied to any laser beam (not just Gaussian beams) by using the intensity profile I(x, y, z) that describes the laser beam. In the case of the $TEM_{00}$ mode of a Gaussian beam, the intensity profile is given by:

$$I(x, y) = \frac{\sqrt{\pi}}{2} w_0 e^{\frac{-2(x^2+y^2)}{w_0^2}} \quad (17)$$

where $w_o$ is the radius (defined as the radius at which beam intensity decreases to $1/e^2$ of the peak beam intensity of the beam at a beam waist position $z_o$. From Equation (17) and the above formulas, we obtain the following results for a $TEM_{00}$ Gaussian beam:

$$\sigma_{0x}^2 = \sigma_{0y}^2 = \frac{w_0^2}{4} \quad (18)$$

$$\sigma_{\infty x}^2 = \sigma_{\infty y}^2 = \frac{1}{4\pi^2 w_0^2} \quad (19)$$

$$M_x^2 = 4\pi\sigma_{0x}\sigma_{\infty x} = 1 \quad (20)$$

$$M_y^2 = 4\pi\sigma_{0y}\sigma_{\infty y} = 1 \quad (21)$$

$$Z_{Rx} = \frac{4\pi\sigma_{0x}^2}{M_x^2\lambda} = \frac{\pi w_0^2}{\lambda} \quad (22)$$

$$Z_{Ry} = \frac{4\pi\sigma_{0y}^2}{M_y^2\lambda} = \frac{\pi w_0^2}{\lambda} \quad (23)$$

$$w^2(z) = w_0^2 + \frac{\lambda^2}{(\pi w_0)^2}(z-z_0)^2 = w_0^2\left[1 + \frac{(z-z_0)^2}{Z_R^2}\right] \quad (24)$$

where $Z_R = Z_{Rx} = Z_{Ry}$. For Gaussian beams, it is further noted that $M^2 = M_x^2 = M_y^2 = 1$.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value, denoted in Equation (17) as $w_0$. The maximum intensity of a Gaussian beam occurs at the center (x=0 and y=0 (Cartesian) or r=0 (cylindrical)) of the intensity distribution and radial extent used to determine spot size is measured relative to the center.

Beams with axisymmetric (i.e. rotationally symmetric around the beam propagation axis Z) cross sections can be characterized by a single dimension or spot size that is measured at the beam waist location as specified in Section 3.12 of ISO 11146-1:2005(E). For a Gaussian beam, Equation (17) shows that spot size is equal to $w_o$, which from Equation (18) corresponds to $2\sigma_{0x}$ or $2\sigma_{0y}$. For an axisymmetric beam having an axisymmetric cross section, such as a circular cross section, $\sigma_{0x} = \sigma_{0y}$. Thus, for axisymmetric beams, the cross section dimension may be characterized with a single spot size parameter, where $w_o = 2\sigma_0$. Spot size can be similarly defined for non-axisymmetric beam cross sections where, unlike an axisymmetric beam, $\sigma_{0x} \neq \sigma_{0y}$. Thus, when the spot size of the beam is non-axisymmetric, it is necessary to characterize the cross-sectional dimensions of a non-axisymmetric beam with two spot size parameters: $w_{ox}$ and $w_{oy}$ in the x-direction and y-direction, respectively, where $$w_{ox} = 2\sigma_{0x} \quad (25)$$

$$w_{oy} = 2\sigma_{0y} \quad (26)$$

Further, the lack of axial (i.e. arbitrary rotation angle) symmetry for a non-axisymmetric beam means that the results of a calculation of values of $\sigma_{0x}$ and $\sigma_{0y}$ will depend on the choice of orientation of the X-axis and Y-axis. ISO 11146-1:2005(E) refers to these reference axes as the principal axes of the power density distribution (Section 3.3-3.5) and in the following discussion we will assume that the X and Y axes are aligned with these principal axes. Further, an angle φ about which the X-axis and Y-axis may be rotated in the cross-sectional plane (e.g., an angle of the X-axis and Y-axis relative to reference positions for the X-axis and Y-axis, respectively) may be used to define minimum ($w_{o,min}$) and maximum values ($w_{o,max}$) of the spot size parameters for a non-axisymmetric beam:

$$w_{o,min} = 2\sigma_{0,min} \quad (27)$$

$$w_{o,max} = 2\sigma_{0,max} \quad (28)$$

where $2\sigma_{0,min} = 2\sigma_{0x}(\phi_{min,x}) = 2\sigma_{0y}(\phi_{min,y})$ and $2\sigma_{0,max} = 2\sigma_{0x}(\phi_{max,x}) = 2\sigma_{0y}(\phi_{max,y})$ The magnitude of the axial asymmetry of the beam cross section can be quantified by the aspect ratio, where the aspect ratio is defined as the ratio of $w_{o,max}$ to $w_{o,min}$. An axisymmetric beam cross section has an aspect ratio of 1.0, while elliptical and other non-axisymmetric beam cross sections have aspect ratios greater than 1.0, for example, greater than 1.1, greater than 1.2, greater than 1.3, greater than 1.4, greater than 1.5, greater than 1.6, greater than 1.7, greater than 1.8, greater than 1.9, greater than 2.0, greater than 3.0, greater than 5.0, greater than 10.0, or the like To promote uniformity of defects 172 in the beam propagation direction (e.g. depth dimension of the transparent workpiece 160), a pulsed laser beam 112 having low divergence may be used. In one or more embodiments, pulsed laser beams 112 having low divergence may be utilized for forming defects 172. As noted above, divergence can be characterized by the Rayleigh range. For non-axisymmetric beams, Rayleigh ranges for the principal axes X and Y are defined by Equations (15) and (16) for the X-direction and Y-direction, respectively, where it can be shown that for any real beam, $M_x^2 > 1$ and $M_y^2 > 1$ and where $\sigma_{0x}^2$ and $\sigma_{0y}^2$ are determined by the intensity distribution of the laser beam. For symmetric beams, Rayleigh range is the same in the X-direction and Y-direction and is expressed by Equation (22) or Equation (23). Low divergence correlates with large values of the Rayleigh range and weak diffraction of the laser beam.

Beams with Gaussian intensity profiles may be less preferred for laser processing to form defects 172 because, when focused to small enough spot sizes (such as spot sizes in the range of microns, such as about 1-5 μm or about 1-10 μm) to enable available laser pulse energies to modify materials such as glass, they are highly diffracting and diverge significantly over short propagation distances. To achieve low divergence, it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

For non-axisymmetric beams, the Rayleigh ranges $Z_{Rx}$ and $Z_{Ry}$ are unequal. Equations (15) and (16) indicate that $Z_{Rx}$ and $Z_{Ry}$ depend on $\sigma_{0x}$ and $\sigma_{0y}$, respectively, and above we noted that the values of $\sigma_{0x}$ and $\sigma_{0y}$ depend on the orientation of the X-axis and Y-axis. The values of $Z_{Rx}$ and $Z_{Ry}$ will accordingly vary, and each will have a minimum value and a maximum value that correspond to the principal axes, with the minimum value of $Z_{Rx}$ being denoted as $Z_{Rx,min}$ and the minimum value of of $Z_{Ry}$ being denoted $Z_{Ry,min}$ for an arbitrary beam profile $Z_{Rx,min}$ and $Z_{Ry,min}$ can be shown to be given by $$Z_{Rx,min} = \frac{4\pi\sigma_{0,min}^2}{M_x^2 \lambda} \quad (29)$$

and $$Z_{Ry,min} = \frac{4\pi\sigma_{0,min}^2}{M_y^2 \lambda} \quad (30)$$

Since divergence of the laser beam occurs over a shorter distance in the direction having the smallest Rayleigh range, the intensity distribution of the pulsed laser beam 112 used to form defects 172 may be controlled so that the minimum values of $Z_{Rx}$ and $Z_{Ry}$ (or for axisymmetric beams, the value of $Z_R$) are as large as possible. Since the minimum value $Z_{Rx,min}$ of $Z_{Rx}$ and the minimum value $Z_{Ry,min}$ of $Z_{Ry}$ differ for a non-axisymmetric beam, a pulsed laser beam 112 may be used with an intensity distribution that makes the smaller of $Z_{Rx,min}$ and $Z_{Ry,min}$ as large as possible when forming damage regions.

In different embodiments, the smaller of $Z_{Rx,min}$ and $Z_{Ry,min}$ (or for axisymmetric beams, the value of $Z_R$) is greater than or equal to 50 µm, greater than or equal to 100 µm, greater than or equal to 200 µm, greater than or equal to 300 µm, greater than or equal to 500 µm, greater than or equal to 1 mm, greater than or equal to 2 mm, greater than or equal to 3 mm, greater than or equal to 5 mm, in the range from 50 µm to 10 mm, in the range from 100 µm to 5 mm, in the range from 200 µm to 4 mm, in the range from 300 µm to 2 mm, or the like.

The values and ranges for the smaller of $Z_{Rx,min}$ and $Z_{Ry,min}$ (or for axisymmetric beams, the value of $Z_R$) specified herein are achievable for different wavelengths to which the workpiece is transparent through adjustment of the spot size parameter $w_{o,min}$ defined in Equation (27). In different embodiments, the spot size parameter $w_{o,min}$ is greater than or equal to 0.25 µm, greater than or equal to 0.50 µm, greater than or equal to 0.75 µm, greater than or equal to 1.0 µm, greater than or equal to 2.0 µm, greater than or equal to 3.0 µm, greater than or equal to 5.0 µm, in the range from 0.25 µm to 10 µm, in the range from 0.25 µm to 5.0 µm, in the range from 0.25 µm to 2.5 µm, in the range from 0.50 µm to 10 µm, in the range from 0.50 µm to 5.0 µm, in the range from 0.50 µm to 2.5 µm, in the range from 0.75 µm to 10 µm, in the range from 0.75 µm to 5.0 µm, in the range from 0.75 µm to 2.5 µm, or the like.

Non-diffracting or quasi non-diffracting beams generally have complicated intensity profiles, such as those that decrease non-monotonically vs. radius. By analogy to a Gaussian beam, an effective spot size $w_{o,eff}$ can be defined for non-axisymmetric beams as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range based on the effective spot size $w_{o,eff}$ for non-axisymmetric beams or the spot size $w_o$ for axisymmetric beams can be specified as non-diffracting or quasi non-diffracting beams for forming damage regions using equation (31) for non-axisymmetric beams of equation (32) for axisymmetric beams, below:

$$\text{Smaller of } Z_{Rx,min}, Z_{Ry,min} > F_D \frac{\pi w_{0,eff}^2}{\lambda} \quad (31)$$

$$Z_R > F_D \frac{\pi w_0^2}{\lambda} \quad (32)$$

where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. By comparing Equation (31) to Equation (22) or (23), one can see that for a non-diffracting or quasi non-diffracting beam the distance, Smaller of $Z_{Rx,min}$, $Z_{Ry,min}$ in Equation (31), over which the effective beam size doubles, is $F_D$ times the distance expected if a typical Gaussian beam profile were used. The dimensionless divergence factor $F_D$ provides a criterion for determining whether or not a laser beam is quasi-non-diffracting. As used herein, the pulsed laser beam 112 is considered quasi-non-diffracting if the characteristics of the laser beam satisfy Equation (31) or Equation (32) with a value of $F_D \geq 10$. As the value of $F_D$ increases, the pulsed laser beam 112 approaches a more nearly perfectly non-diffracting state. Moreover, it should be understood that Equation (32) is merely a simplification of Equation (31) and as such, Equation (31) mathematically describes the dimensionless divergence factor $F_D$ for both axisymmetric and non-axisymmetric pulsed laser beams 112.

Figure 5:
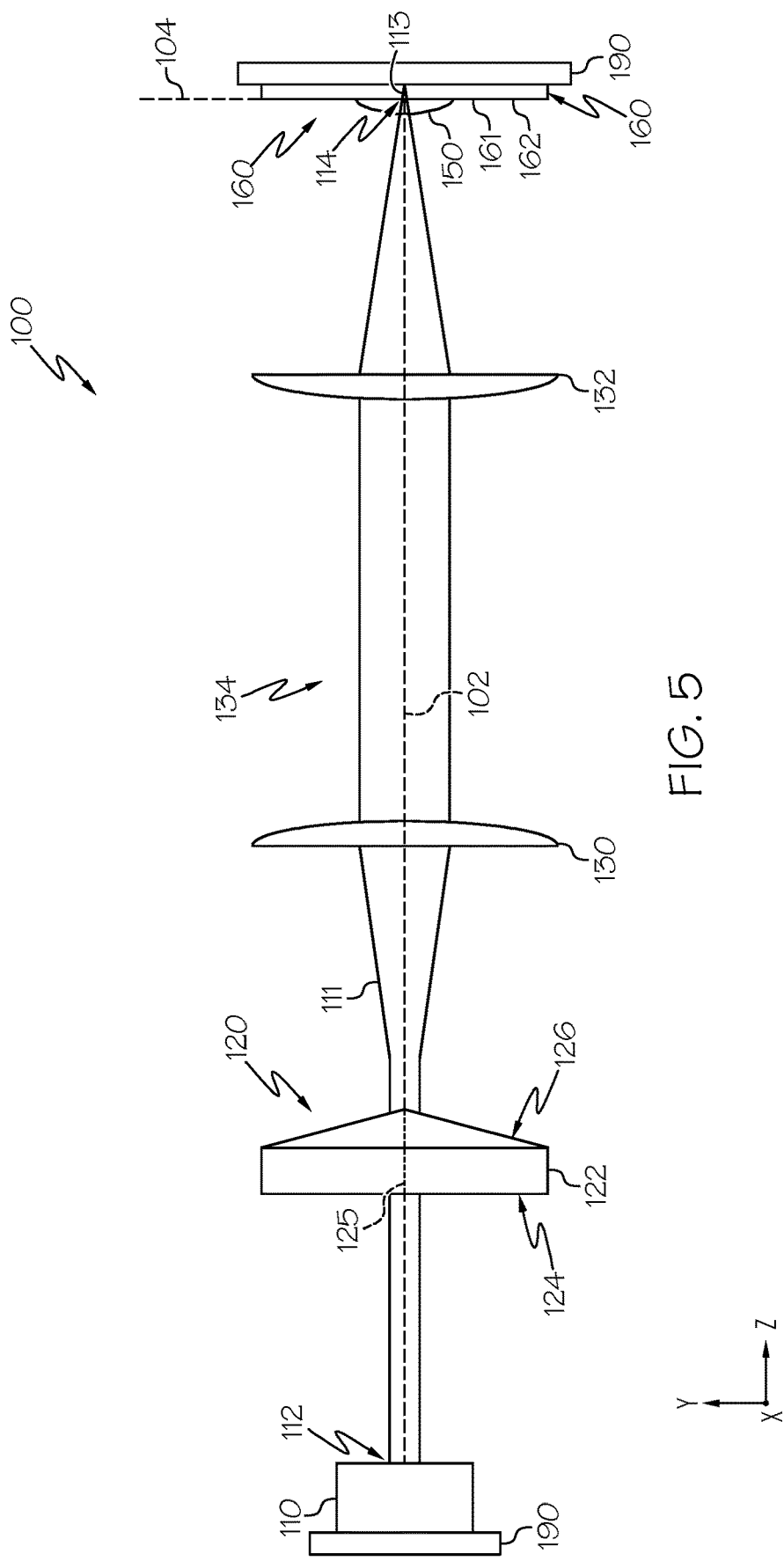
FIG. 5 schematically depicts an optical assembly for laser processing, according to one or more embodiments described herein.

Referring now to FIG. 5, an optical assembly 100 for producing a pulsed laser beam 112 that that is quasi-non-diffracting and forms the pulsed laser beam focal line 113 at the transparent workpiece 160 using the aspheric optical element 120 (e.g., an axicon 122) is schematically depicted. The optical assembly 100 includes a beam source 110 that outputs the pulsed laser beam 112, and a first and second lens 130, 132. As stated above, other laser beams may be used in combination with fluid films to laser process transparent workpieces having a rough surface and thus, the methods of laser processing described herein may be performed with other optical assemblies configured to direct a laser beam into a transparent workpiece. Further, the optical assembly 100 is also depicted in FIG. 3A.

The transparent workpiece 160 may be positioned such that the pulsed laser beam 112 output by the beam source 110 irradiates the transparent workpiece 160, for example, after traversing the aspheric optical element 120 and thereafter, both the first lens 130 and the second lens 132. An optical axis 102 extends between the beam source 110 and the transparent workpiece 160 along the Z-axis such that when the beam source 110 outputs the pulsed laser beam 112, the beam pathway 111 of the pulsed laser beam 112 extends along the optical axis 102. As used herein "upstream" and "downstream" refer to the relative position of two locations or components along the beam pathway 111 with respect to the beam source 110. For example, a first component is upstream from a second component if the pulsed laser beam 112 traverses the first component before traversing the second component. Further, a first component is downstream from a second component if the pulsed laser beam 112 traverses the second component before traversing the first component.

Referring still to FIG. 5, the beam source 110 may comprise any known or yet to be developed beam source 110 configured to output pulsed laser beams 112. In operation, the defects 172 of the contour 170 (FIG. 1) are produced by interaction of the transparent workpiece 160 with the pulsed laser beam 112 output by the beam source 110. In some embodiments, the beam source 110 may output a pulsed laser beam 112 comprising a wavelength of for example, 1064 nm, 1030 nm, 532 nm, 530 nm, 355 nm, 343 nm, or 266 nm, or 215 nm. Further, the pulsed laser beam 112 used to form defects 172 in the transparent workpiece 160 may be well suited for materials that are transparent to the selected pulsed laser wavelength.

Suitable laser wavelengths for forming defects 172 are wavelengths at which the combined losses of linear absorption and scattering by the transparent workpiece 160 are sufficiently low. In embodiments, the combined losses due to linear absorption and scattering by the transparent workpiece 160 at the wavelength are less than 20%/mm, or less than 15%/mm, or less than 10%/mm, or less than 5%/mm, or less than 1%/mm, where the dimension "/mm" means per millimeter of distance within the transparent workpiece 160 in the beam propagation direction of the pulsed laser beam 112 (e.g., the Z direction). Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

In operation, the pulsed laser beam 112 output by the beam source 110 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the contour 170 (FIG. 1) may utilize the beam source 110 (e.g., an ultra-short pulse laser) in combination with optical components, such as the aspheric optical element 120, the first lens 130, and the second lens 132, to project the beam spot 114 on the transparent workpiece 160 and generate the pulsed laser beam focal line 113. The pulsed laser beam focal line 113 comprises a quasi-non-diffracting beam, such as a Gauss-Bessel beam or Bessel beam, as defined above, and may fully perforate the transparent workpiece 160 to form defects 172 in the transparent workpiece 160, which may form the contour 170. In some embodiments, the pulse duration of the individual pulses is in a range of from about 1 femtosecond to about 200 picoseconds, such as from about 1 picosecond to about 100 picoseconds, 5 picoseconds to about 20 picoseconds, or the like, and the repetition rate of the individual pulses may be in a range from about 1 kHz to 4 MHz, such as in a range from about 10 kHz to about 3 MHz, or from about 10 kHz to about 650 kHz.

Referring also to FIGS. 6A and 6B, in addition to a single pulse operation at the aforementioned individual pulse repetition rates, the pulses may be produced in pulse bursts 500 of two sub-pulses 500A or more (such as, for example, 3 sub-pulses, 4 sub-pulses, 5 sub-pulses, 10 sub-pulses, 15 sub-pulses, 20 sub-pulses, or more per pulse burst, such as from 2 to 30 sub-pulses per pulse burst 500, or from 5 to 20 sub-pulses per pulse burst 500). While not intending to be limited by theory, a pulse burst is a short and fast grouping of sub-pulses that creates an optical energy interaction with the material (i.e. MPA in the material of the transparent workpiece 160) on a time scale not easily accessible using a single-pulse operation. While still not intending to be limited by theory, the energy within a pulse burst (i.e. a group of sub-pulses) is conserved. As an illustrative example, for a pulse burst having an energy of 100 µJ/burst and 2 sub-pulses, the 100 µJ/burst energy is split between the 2 pulses for an average energy of 50 µJ per sub-pulse and for a pulse burst having an energy of 100 µJ/burst and 10 sub-pulses, the 100 µJ/burst is split amongst the 10 sub-pulses for an average energy of 10 µJ per sub-pulse. Further, the energy distribution among the sub-pulses of a pulse burst does not need to be uniform. In fact, in some instances, the energy distribution among the sub-pulses of a pulse burst is in the form of an exponential decay, where the first sub-pulse of the pulse burst contains the most energy, the second sub-pulse of the pulse burst contains slightly less energy, the third sub-pulse of the pulse burst contains even less energy, and so on. However, other energy distributions within an individual pulse burst are also possible, where the exact energy of each sub-pulse can be tailored to effect different amounts of modification to the transparent workpiece 160.

While still not intending to be limited by theory, when the defects 172 of the contour 170 are formed with pulse bursts having at least two sub-pulses, the force necessary to separate the transparent workpiece 160 along the contour 170 (i.e. the maximum break resistance) is reduced compared to the maximum break resistance of a contour 170 with the same spacing between adjacent defects 172 in an identical transparent workpiece 160 that is formed using a single pulse laser. For example, the maximum break resistance of a contour 170 formed using a single pulse is at least two times greater than the maximum break resistance of a contour 170 formed using a pulse burst having 2 or more sub-pulses. Further, the difference in maximum break resistance between a contour 170 formed using a single pulse and a contour 170 formed using a pulse burst having 2 sub-pulses is greater than the difference in maximum break resistance between a contour 170 formed using a pulse burst having 2 sub-pulses and a pulse burst having 3 sub-pulses. Thus, pulse bursts may be used to form contours 170 that separate easier than contours 170 formed using a single pulse laser.

Referring still to FIGS. 6A and 6B, the sub-pulses 500A within the pulse burst 500 may be separated by a duration that is in a range from about 1 nsec to about 50 nsec, for example, from about 10 nsec to about 30 nsec, such as about 20 nsec. In other embodiments, the sub-pulses 500A within the pulse burst 500 may be separated by a duration of up to 100 psec (for example, 0.1 psec, 5 psec, 10 psec, 15 psec, 18 psec, 20 psec, 22 psec, 25 psec, 30 psec, 50 psec, 75 psec, or any range therebetween). For a given laser, the time separation $T_p$ (FIG. 6B) between adjacent sub-pulses 500A within a pulse burst 500 may be relatively uniform (e.g., within about 10% of one another). For example, in some embodiments, each sub-pulse 500A within a pulse burst 500 is separated in time from the subsequent sub-pulse by approximately 20 nsec (50 MHz). Further, the time between each pulse burst 500 may be from about 0.25 microseconds to about 1000 microseconds, e.g., from about 1 microsecond to about 10 microseconds, or from about 3 microseconds to about 8 microseconds.

In some of the exemplary embodiments of the beam source 110 described herein, the time separation $T_b$ (FIG. 6B) is about 5 microseconds for the beam source 110 outputting a pulsed laser beam 112 comprising a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first sub-pulse in each burst to the first sub-pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50 k Hz burst repetition rate). The exact timing, pulse duration, and burst repetition rate may vary depending on the laser design, but short sub-pulses ($T_d$<20 psec and, in some embodiments, $T_d \leq 15$ psec) of high intensity have been shown to work particularly well.

The burst repetition rate may be in a range of from about 1 kHz to about 2 MHz, such as from about 1 kHz to about 200 kHz. Bursting or producing pulse bursts 500 is a type of laser operation where the emission of sub-pulses 500A is not in a uniform and steady stream but rather in tight clusters of pulse bursts 500. The pulse burst laser beam may have a wavelength selected based on the material of the transparent workpiece 160 being operated on such that the material of the transparent workpiece 160 is substantially transparent at the wavelength. The average laser power per burst measured at the material may be at least about 40 µJ per mm of thickness of material. For example, in embodiments, the average laser power per burst may be from about 40 µJ/mm to about 2500 µJ/mm, or from about 500 µJ/mm to about 2250 µJ/mm. In a specific example, for 0.5 mm to 0.7 mm thick Corning EAGLE XG® transparent workpiece, pulse bursts of from about 300 µJ to about 600 µJ may cut and/or separate the workpiece, which corresponds to an exemplary range of about 428 µJ/mm to about 1200 µJ/mm (i.e., 300 µJ/0.7 mm for 0.7 mm EAGLE XG® glass and 600 µJ/0.5 mm for a 0.5 mm EAGLE XG® glass).

The energy required to modify the transparent workpiece 160 is the pulse energy, which may be described in terms of pules burst energy (i.e., the energy contained within a pulse burst 500 where each pulse burst 500 contains a series of sub-pulses 500A), or in terms of the energy contained within a single laser pulse (many of which may comprise a burst). The pulse energy (for example, pulse burst energy) may be from about 25 µJ to about 750 µJ, e.g., from about 50 µJ to about 500 µJ, or from about 50 µJ to about 250 µJ. For some glass compositions, the pulse energy (e.g., pulse burst energy) may be from about 100 µJ to about 250 µJ. However, for display or TFT glass compositions, the pulse energy (e.g., pulse burst energy) may be higher (e.g., from about 300 µJ to about 500 µJ, or from about 400 µJ to about 600 µJ, depending on the specific glass composition of the transparent workpiece 160). While not intending to be limited by theory, the use of a pulsed laser beam 112 capable of generating pulse bursts is advantageous for cutting or modifying transparent materials, for example glass. In contrast with the use of single pulses spaced apart in time by the repetition rate of the single-pulsed laser, the use of a burst sequence that spreads the pulse energy over a rapid sequence of sub-pulses within the burst allows access to larger timescales of high intensity interaction with the material than is possible with single-pulse lasers.

Referring again to FIG. 5, the aspheric optical element 120 is positioned within the beam pathway 111 between the beam source 110 and the transparent workpiece 160. In operation, propagating the pulsed laser beam 112, e.g., an incoming Gaussian beam, through the aspheric optical element 120 may alter the pulsed laser beam 112 such that the portion of the pulsed laser beam 112 propagating beyond the aspheric optical element 120 is quasi-non-diffracting, as described above. The aspheric optical element 120 may comprise any optical element comprising an aspherical shape. In some embodiments, the aspheric optical element 120 may comprise a conical wavefront producing optical element, such as an axicon lens, for example, a negative refractive axicon lens (e.g., a negative axicon), a positive refractive axicon lens, a reflective axicon lens, a diffractive axicon lens, a programmable spatial light modulator axicon lens (e.g., a phase axicon), or the like.

In some embodiments, the aspheric optical element 120 comprises at least one aspheric surface whose shape is mathematically described as: $z'=(cr^2/1)+(1-(1+k)(c^2r^2))^{1/2}+(a_1 r+a_2 r^2+a_3 r^3+a_4 r^4+a_5 r^5+a_6 r^6+a_7 r^7+a_8 r^8+a_9 r^9+a_{10} r^{10}+a_{11} r^{11}+a_{12} r^{12}$ where z' is the surface sag of the aspheric surface, r is the distance between the aspheric surface and the optical axis 102 in a radial direction (e.g., in an X-direction or a Y-direction), c is the surface curvature of the aspheric surface (i.e. $c_i=1/R_i$, where R is the surface radius of the aspheric surface), k is the conic constant, and coefficients $a_i$ are the first through the twelfth order aspheric coefficients or higher order aspheric coefficients (polynomial aspheres) describing the aspheric surface. In one example embodiment, at least one aspheric surface of the aspheric optical element 120 includes the following coefficients $a_1$-$a_7$, respectively: −0.085274788; 0.065748845; 0.077574995; −0.054148636; 0.022077021; −0.0054987472; 0.0006682955; and the aspheric coefficients $a_8$-$a_{12}$ are 0. In this embodiment, the at least one aspheric surface has the conic constant k=0. However, because the $a_1$ coefficient has a nonzero value, this is equivalent to having a conic constant k with a non-zero value. Accordingly, an equivalent surface may be described by specifying a conic constant k that is non zero, a coefficient $a_1$ that is non-zero, or a combination of a nonzero k and a non-zero coefficient $a_1$. Further, in some embodiments, the at least one aspheric surface is described or defined by at least one higher order aspheric coefficients $a_2$-$a_{12}$ with non-zero value (i.e., at least one of $a_2, a_3, \ldots, a_{12} \neq 0$). In one example embodiment, the aspheric optical element 120 comprises a third-order aspheric optical element such as a cubically shaped optical element, which comprises a coefficient $a_3$ that is non-zero.

In some embodiments, when the aspheric optical element 120 comprises an axicon 122 (as depicted in FIG. 5), the axicon 122 may have a laser output surface 126 (e.g., conical surface) having an angle of about 1.2°, such as from about 0.5° to about 5°, or from about 1° to about 1.5°, or even from about 0.5° to about 20°, the angle measured relative to the laser input surface 124 (e.g., flat surface) upon which the pulsed laser beam 112 enters the axicon 122. Further, the laser output surface 126 terminates at a conical tip. Moreover, the aspheric optical element 120 includes a centerline axis 125 extending from the laser input surface 124 to the laser output surface 126 and terminating at the conical tip. In other embodiments, the aspheric optical element 120 may comprise a waxicon, a spatial phase modulator such as a spatial light modulator, or a diffractive optical grating. In operation, the aspheric optical element 120 shapes the incoming pulsed laser beam 112 (e.g., an incoming Gaussian beam) into a quasi-non-diffracting beam, which, in turn, is directed through the first lens 130 and the second lens 132.

Referring still to FIG. 5, the first lens 130 is positioned upstream the second lens 132 and may collimate the pulsed laser beam 112 within a collimation space 134 between the first lens 130 and the second lens 132. Further, the second lens 132 may focus the pulsed laser beam 112 into the transparent workpiece 160, which may be positioned at an imaging plane 104. In some embodiments, the first lens 130 and the second lens 132 each comprise plano-convex lenses. When the first lens 130 and the second lens 132 each comprise plano-convex lenses, the curvature of the first lens 130 and the second lens 132 may each be oriented toward the collimation space 134. In other embodiments, the first lens 130 may comprise other collimating lenses and the second lens 132 may comprise a meniscus lens, an asphere, or another higher-order corrected focusing lens.

Referring again to FIGS. 1-5, a method for forming the contour 170 comprising defects 172 along the contour line 165 of a transparent workpiece 160 comprising a rough surface, e.g., a impingement surface 162 comprising a rough surface, for example, a impingement surface 162 having a surface roughness Ra of about 0.1 µm or greater, comprises first applying the fluid film 150 to the impingement surface 162 of the transparent workpiece 160, for example, using any of the method described above with respect to FIGS. 3A-4 or using any other known or yet-to-be-developed fluid application method. Next, the method comprises directing (e.g., localizing) a laser beam such as the pulsed laser beam 112) oriented along the beam pathway 111 and output by the beam source 110 through the fluid film 150, through the impingement surface 162 and into the transparent workpiece 160 such that the portion of the pulsed laser beam 112 directed into the transparent workpiece 160 generates an induced absorption within the transparent workpiece and the induced absorption produces a defect 172 within the transparent workpiece 160. Further, as depicted in FIGS. 1-5, the fluid film 150 is disposed in contact with the impingement surface 162 of the transparent workpiece 160 without contact with another substrate or component. In other words, the fluid film 150 is not an intervening layer separating the transparent workpiece 160 from another substrate or component, such as a sacrificial layer. Thus, in operation, the pulsed laser beam 112 propagates from the most downstream optic of the optical assembly 100 (e.g., the second lens 132) into free-space and then propagates directly from free-space into the fluid film 150.

In embodiments using the pulsed laser beam 112, the pulsed laser beam 112 may comprise a pulse energy and a pulse duration sufficient to exceed a damage threshold of the transparent workpiece 160. In some embodiments, directing the pulsed laser beam 112 into the transparent workpiece 160 comprises focusing the pulsed laser beam 112 output by the beam source 110 into the pulsed laser beam focal line 113 oriented along the beam propagation direction (e.g., the Z axis from the beam source 110 to the transparent workpiece 160). The transparent workpiece 160 is positioned in the beam pathway 111 to at least partially overlap the pulsed laser beam focal line 113 of pulsed laser beam 112. The pulsed laser beam focal line 113 is thus directed into the transparent workpiece 160. The pulsed laser beam 112, e.g., the pulsed laser beam focal line 113 generates induced absorption within the transparent workpiece 160 to create the defect 172 in the transparent workpiece 160. In some embodiments, individual defects 172 may be created at rates of several hundred kilohertz (i.e., several hundred thousand defects per second).

In some embodiments, the aspheric optical element 120 may focus the pulsed laser beam 112 into the pulsed laser beam focal line 113. In operation, the position of the pulsed laser beam focal line 113 may be controlled by suitably positioning and/or aligning the pulsed laser beam 112 relative to the transparent workpiece 160 as well as by suitably selecting the parameters of the optical assembly 100. For example, the position of the pulsed laser beam focal line 113 may be controlled along the Z-axis and about the Z-axis. Further, the pulsed laser beam focal line 113 may have a length in a range of from about 0.1 mm to about 100 mm or in a range of from about 0.1 mm to about 10 mm. Various embodiments may be configured to have a pulsed laser beam focal line 113 with a length 1 of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm. Further, the pulsed laser beam focal line 113 may be positioned in the transparent workpiece 160, in the fluid film 150, and/or in the air or other medium surrounding the transparent workpiece 160 and the fluid film 150.

Referring still to FIGS. 1-5, the method for forming the contour 170 comprising defects 172 along the contour line 165 may include translating the transparent workpiece 160 relative to the pulsed laser beam 112 (or the pulsed laser beam 112 may be translated relative to the transparent workpiece 160, for example, in the translation direction 101 depicted in FIGS. 1, 3B, 3C, and 3D) to form the contour 170. The defects 172 that may penetrate the full depth of the glass. It should be understood that while sometimes described as "holes" or "hole-like," the defects 172 disclosed herein may generally not be void spaces, but are rather portions of the transparent workpiece 160 which has been modified by laser processing as described herein.

In some embodiments, the defects 172 may generally be spaced apart from one another by a distance along the contour 170 of from about 0.1 µm to about 500 µm, for example, about 1 µm to about 200 µm, about 2 µm to about 100 µm, about 5 µm to about 20 µm, or the like. For example, suitable spacing between the defects 172 may be from about 0.1 µm to about 50 µm, such as from about 5 µm to about 15 µm, from about 5 µm to about 12 µm, from about 7 µm to about 15 µm, or from about 7 µm to about 12 µm for the TFT/display glass compositions. In some embodiments, a spacing between adjacent defects 172 may be about 50 µm or less, 45 µm or less, 40 µm or less, 35 µm or less, 30 µm or less, 25 µm or less, 20 µm or less, 15 µm or less, 10 µm or less, or the like. Further, the translation of the transparent workpiece 160 relative to the pulsed laser beam 112 may be performed by moving the transparent workpiece 160 and/or the beam source 110 using one or more translation stages 180.

Beyond the perforation of a single transparent workpiece 160, the process may also be used to perforate stacks of transparent workpieces 160, such as stacks of sheets of glass, and may fully perforate glass stacks of up to a few mm total height with a single laser pass. A single glass stack may be comprised of various glass types within the stack, for example one or more layers of soda-lime glass layered with one or more layers of Corning code 2318 glass. The glass stacks additionally may have air gaps in various locations. According to another embodiment, ductile layers such as adhesives may be disposed between the glass stacks. However, the pulsed laser process described herein will still, in a single pass, fully perforate both the upper and lower glass layers of such a stack.

In view of the foregoing description, it should be understood that a fluid film may be applied to a rough surface of a transparent workpiece to facilitate formation of a contour of defects in the transparent workpiece. The fluid film may minimize optical alterations of the pulsed laser beam, such as reflection and dispersion that would occur upon direct irradiation of the pulsed laser beam onto the rough surface of the transparent workpiece (i.e. instances in which free-space (e.g., air), not the fluid film, is in direct contact with the rough surface), facilitating efficient and effective separation of transparent workpieces having rough surfaces.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for processing a transparent workpiece, the method comprising:
    applying a fluid film comprising a first refractive index of 1.01 to 1.09 to an impingement surface of the transparent workpiece, wherein the transparent workpiece comprises a second refractive index, wherein a difference between the first refractive index and the second refractive index is 0.8 or less, and wherein the impingement surface comprises a surface roughness Ra of 0.1 µm or greater; and
    forming a defect in the transparent workpiece by directing a laser beam, oriented along a beam pathway and output by a beam source, through the fluid film, through the impingement surface, and into the transparent workpiece such that a portion of the laser beam directed into the transparent workpiece forms a laser beam focal line generating an induced absorption within the transparent workpiece, the induced absorption producing the defect within the transparent workpiece, wherein the portion of the laser beam directed into the transparent workpiece is a quasi-non-diffracting beam; and wherein the defect conforms to a shape of the quasi-non-diffracting beam and extends through the transparent workpiece.

2. The method of claim 1, further comprising translating the transparent workpiece and the laser beam relative to each other along a contour line, thereby laser forming a contour comprising a plurality of defects within the transparent workpiece along the contour line.

3. The method of claim 2, further comprising directing an infrared laser beam onto the transparent workpiece along the contour to separate the transparent workpiece along the contour.

4. The method of claim 1, wherein the fluid film comprises water.

5. The method of claim 1, wherein the fluid film comprises an index matching material, wherein the index matching material comprises a gel, an epoxy, or a polymer.

6. The method of claim 1, wherein the difference between the first refractive index and the second refractive index is about 0.5 or less.

7. The method of claim 1, wherein the first refractive index is equal to the second refractive index.

8. The method of claim 1, wherein applying the fluid film to the impingement surface of the transparent workpiece comprises submerging the impingement surface in a fluid thereby forming the fluid film on the impingement surface of the transparent workpiece.

9. The method of claim 1, wherein applying the fluid film to the impingement surface of the transparent workpiece comprises directing fluid from a fluid output mechanism onto the impingement surface.

10. The method of claim 1, wherein the laser beam comprises a pulsed laser beam having a wavelength $\lambda$ and wherein the transparent workpiece has combined losses due to linear absorption and scattering less than 20%/mm in a beam propagation direction.

11. The method of claim 1, wherein a spacing between adjacent defects is 50 µm or less.

12. The method of claim 1, wherein the pulsed laser beam propagates directly from free-space into the fluid film.

13. A method for processing a transparent workpiece, the method comprising:
    applying a fluid film comprising a first refractive index to a impingement surface of the transparent workpiece, wherein the transparent workpiece comprises a second refractive index, a difference between the first refractive index and the second refractive index is about 0.8 or less, and the impingement surface comprises a surface roughness Ra of about 0.1 µm or greater;
    forming a contour in the transparent workpiece along a contour line, the contour comprising a plurality of defects in the transparent workpiece, wherein forming the contour comprises:

directing a pulsed laser beam oriented along a beam pathway and output by a beam source, through an aspheric optical element, through the fluid film, through the impingement surface, and into the transparent workpiece such that a portion of the pulsed laser beam directed into the transparent workpiece generates an induced absorption within the transparent workpiece, the induced absorption producing a defect within the transparent workpiece and the portion of the pulsed laser beam directed into the transparent workpiece comprises:

a wavelength $\lambda$;

an effective spot size $w_{o,eff}$; and a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor comprising a value of 10 or greater; and translating the transparent workpiece and the pulsed laser beam relative to each other along the contour line, thereby laser forming the contour comprising the plurality of defects within the transparent workpiece along the contour line.

14. The method of claim 13, further comprising directing an infrared laser beam onto the transparent workpiece along or near the contour to separate the transparent workpiece along the contour.

15. The method of claim 13, wherein the fluid film comprises water.

16. The method of claim 13, wherein the fluid film comprises an index matching material comprising a gel, an epoxy, or a polymer.

17. The method of claim 13, wherein the first refractive index is equal to the second refractive index.

18. The method of claim 13, wherein applying the fluid film to the impingement surface of the transparent workpiece comprises submerging the impingement surface in a fluid thereby forming the fluid film on the impingement surface of the transparent workpiece.

19. The method of claim 13, wherein applying the fluid film to the impingement surface of the transparent workpiece comprises directing fluid from a fluid output mechanism onto the impingement surface.

20. The method of claim 1, wherein a cross-section of the laser beam has an area that is uniform in the direction of propagation of the laser beam in the transparent workpiece.

* * * * *